United States Patent
Chae et al.

(10) Patent No.: US 11,627,620 B2
(45) Date of Patent: Apr. 11, 2023

(54) METHOD AND DEVICE FOR TRANSMITTING SYNCHRONIZATION SIGNAL BY MEANS OF SIDELINK TERMINAL IN WIRELESS COMMUNICATION SYSTEM

(71) Applicant: LG ELECTRONICS INC., Seoul (KR)

(72) Inventors: Hyukjin Chae, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

(21) Appl. No.: 17/264,228

(22) PCT Filed: Jul. 31, 2019

(86) PCT No.: PCT/KR2019/009536
§ 371 (c)(1),
(2) Date: Jan. 28, 2021

(87) PCT Pub. No.: WO2020/027572
PCT Pub. Date: Feb. 6, 2020

(65) Prior Publication Data
US 2021/0307098 A1 Sep. 30, 2021

(30) Foreign Application Priority Data

Jul. 31, 2018 (KR) .................. 10-2018-0089029
Jan. 11, 2019 (KR) .................. 10-2019-0004263

(51) Int. Cl.
H04W 56/00 (2009.01)
H04W 76/15 (2018.01)
(Continued)

(52) U.S. Cl.
CPC .......... *H04W 76/15* (2018.02); *H04W 48/20* (2013.01); *H04W 56/001* (2013.01); *H04W 92/18* (2013.01)

(58) Field of Classification Search
CPC ... H04W 76/15; H04W 48/20; H04W 56/001; H04W 92/18
(Continued)

(56) References Cited

U.S. PATENT DOCUMENTS 10,389,567 B2 * 8/2019 Si .................. H04L 27/2675
2016/0044618 A1 * 2/2016 Sheng ............ H04W 56/0005
370/329

(Continued)

FOREIGN PATENT DOCUMENTS

WO 2014158064 10/2014

OTHER PUBLICATIONS

PCT International Application No. PCT/KR2019/009536, International Search Report dated Nov. 6, 2019, 15 pages.
(Continued)

*Primary Examiner* — Sai Ming Chan
(74) *Attorney, Agent, or Firm* — Lee Hong Degerman Kang Waimey

(57) ABSTRACT

Provided is a method for transmitting a signal by means of a sidelink terminal in a wireless communication system, according to an embodiment of the present invention. The method for transmitting a signal comprises the steps of: selecting any one of an eNB and a gNB as a synchronization reference; and transmitting a sidelink channel/signal including an SSB (SS/PBCH block) on the basis of synchronization of the base station selected as the synchronization reference, wherein when dual connectivity (DC) is configured for the terminal, the terminal selects a master NB (NodeB) among the eNB as the synchronization reference.
(Continued)

The UE is capable of communicating with at least one of another UE, a UE related to an autonomous driving vehicle, the BS or a network.

10 Claims, 28 Drawing Sheets

(51) Int. Cl.
*H04W 48/20* (2009.01)
*H04W 92/18* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2018/0083688 | A1* | 3/2018 | Agiwal | H04W 48/16 |
| 2018/0206208 | A1* | 7/2018 | Nguyen | H04W 72/0446 |
| 2018/0324686 | A1* | 11/2018 | Abedini | H04W 48/16 |
| 2019/0090293 | A1* | 3/2019 | Su | H04W 76/14 |
| 2019/0239178 | A1* | 8/2019 | Shilov | H04W 56/002 |
| 2020/0045725 | A1* | 2/2020 | Mochizuki | H04W 72/046 |
| 2021/0067998 | A1* | 3/2021 | Li | H04W 24/10 |
| 2021/0127341 | A1* | 4/2021 | Yasukawa | H04W 24/10 |
| 2021/0160027 | A1* | 5/2021 | Werner | H04B 7/0894 |
| 2021/0368541 | A1* | 11/2021 | Hedayat | H04L 5/0053 |
| 2022/0225456 | A1* | 7/2022 | Futaki | H04W 80/02 |

OTHER PUBLICATIONS

Intel Corporation, "Remaining Sidelink Synchronization Details for LTE V2V Carrier Aggregation," R1-1806482, 3GPP TSG RAN WG1 Meeting #93, May 2018, 6 pages.

LG Electronics, "Discussion on synchronization for sidelink CA," R1-1713088, 3GPP TSG RAN WG1 Meeting #90, Aug. 2017, 5 pages.

Intel Corporation, "Sidelink Synchronization Enhancements for Wearable and IoT Use Cases," R1-1707330, 3GPP TSG RAN WG1 Meeting #89, May 2017, 7 pages.

Intel Corporation, "On synchronization reference source selection/reselection for V2X sidelink CA," R4-1806308, 3GPP TSG-RAN4 Meeting #87, May 2018, 5 pages.

* cited by examiner

METHOD AND DEVICE FOR TRANSMITTING SYNCHRONIZATION SIGNAL BY MEANS OF SIDELINK TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2019/009536, filed on Jul. 31, 2019, which claims the benefit of earlier filing date and right of priority to KR Application Nos. 10-2018-0089029, filed on Jul. 31, 2018 and 10-2019-0004263, filed on Jan. 11, 2019, the contents of which are all hereby incorporated by reference herein in their entirety.

TECHNICAL FIELD

The present disclosure relates to a wireless communication system, and more particularly, to a method and device for selecting a synchronization reference and transmitting a synchronization signal by a sidelink UE.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

DISCLOSURE

Technical Problem

An object of the present disclosure is to provide a method for designing a synchronization signal used for direct communication between devices or V2X and a method for selecting a synchronization reference.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method for transmitting a signal by a sidelink UE in a wireless communications system comprises the steps of selecting any one of an eNB and a gNB as a synchronization reference; and transmitting a sidelink channel/signal including an SSB (SS/PBCH block) on the basis of synchronization of the base station selected as the synchronization reference, wherein when dual connectivity (DC) is configured for the UE, the UE selects a master NB (NodeB) of the eNB and the gNB as the synchronization reference.

In another aspect of the present disclosure, a sidelink UE for transmitting or receiving a signal in a wireless communication system comprises a memory; and a processor coupled to the memory, wherein the processor selects any one of an eNB and a gNB as a synchronization reference, and transmits a sidelink channel/signal including an SSB (SS/PBCH block) on the basis of synchronization of the base station selected as the synchronization reference, and when dual connectivity (DC) is configured for the UE, the UE selects a master NB (NodeB) of the eNB and the gNB as the synchronization reference.

The master NB may be gNB in NE (NR & E-UTRA), and may be eNB in EN (E-UTRA & NR) DC.

The UE may select NB having a high receiving power as a synchronization reference when dual connectivity (DC) is not configured for the UE.

The UE may select NB, which has received SIB including sidelink related resource pool information, as a synchronization reference when dual connectivity (DC) is not configured for the UE.

The UE may select NB on a carrier paired with a carrier for which sidelink communication is performed, as a synchronization reference when dual connectivity (DC) is not configured for the UE.

The UE may select NB corresponding to a format for which sidelink communication is performed, as a synchronization reference when dual connectivity (DC) is not configured for the UE.

The eNB and the gNB may have the same priority as a synchronization reference.

The eNB and the gNB may be configured by the highest synchronization reference priority.

When a plurality of sidelink PSSs or a plurality of sidelink SSSs are transmitted through the SSB, the plurality of sidelink PSSs may respectively be generated from different polynomials.

When a plurality of sidelink PSSs or a plurality of sidelink SSSs are transmitted through the SSB, the plurality of sidelink PSSs identical to one another may consecutively be repeated, and the plurality of sidelink SSSs may use different sequences.

The sidelink PSS or sidelink SSS transmitted through the SSB may be generated by comb type mapping of m sequence of length 63.

Whether the comb type m sequence is mapped to even RE or odd RE may indicate at least one or more of sync beam index, sync resource index and purpose of use of sync signal.

Advantageous Effects

According to one embodiment of the present disclosure, a problem that NB to be selected as a synchronization reference is ambiguous when priority of eNB is equal to that of gNB may be solved.

It will be appreciated by persons skilled in the art that that the effects that can be achieved through the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings.

BEST MODE FOR CARRYING OUT THE INVENTION

1. Driving (1) Exterior of Vehicle

Figure 1:
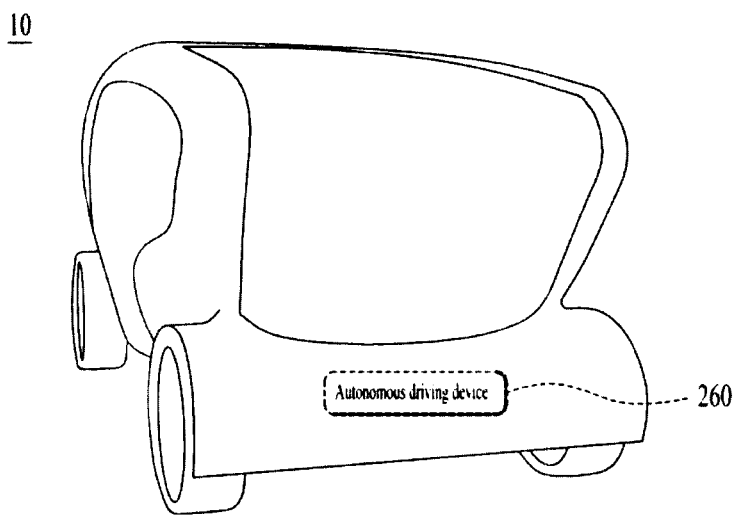
FIG. 1 is a view illustrating a vehicle according to the embodiment of the present disclosure.
Figure 1:
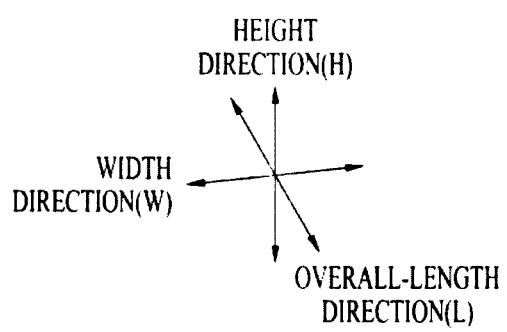

FIG. 1 is a diagram showing a vehicle according to an implementation of the present disclosure.

Referring to FIG. 1, a vehicle 10 according to an implementation of the present disclosure is defined as transportation traveling on roads or railroads. The vehicle 10 includes a car, a train, and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle or a shared vehicle. The vehicle 10 may be an autonomous vehicle.

(2) Components of Vehicle

Figure 2:
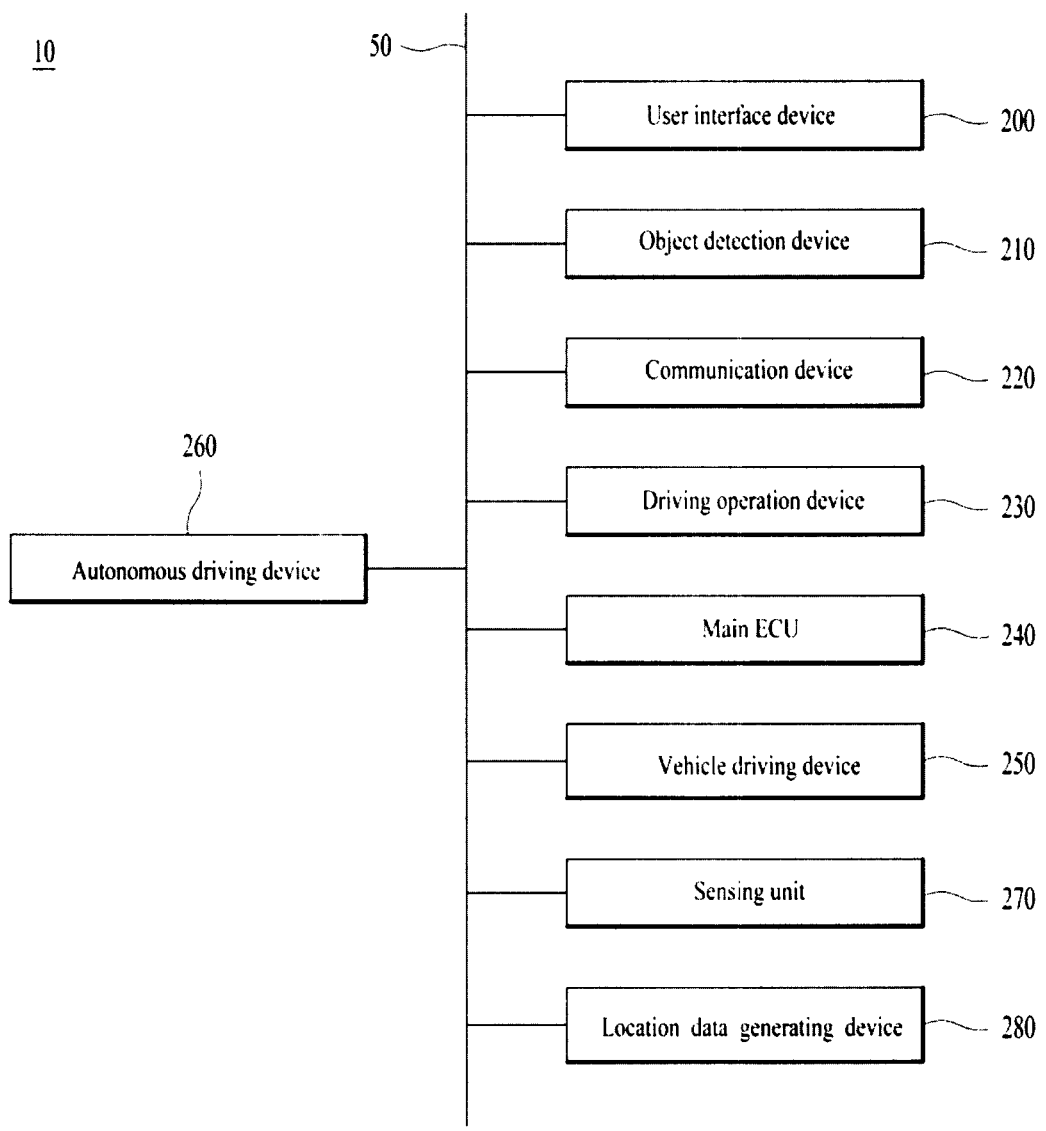
FIG. 2 is a control block view illustrating a vehicle according to the embodiment of the present disclosure.

FIG. 2 is a control block diagram of the vehicle according to an implementation of the present disclosure.

Referring to FIG. 2, the vehicle 10 may include a user interface device 200, an object detection device 210, a communication device 220, a driving operation device 230, a main electronic control unit (ECU) 240, a driving control device 250, an autonomous driving device 260, a sensing unit 270, and a location data generating device 280. Each of the object detection device 210, communication device 220, driving operation device 230, main ECU 240, driving control device 250, autonomous driving device 260, sensing unit 270, and location data generating device 280 may be implemented as an electronic device that generates an electrical signal and exchanges the electrical signal from one another.

1) User Interface Device

The user interface device 200 is a device for communication between the vehicle 10 and a user. The user interface device 200 may receive a user input and provide information generated in the vehicle 10 to the user. The vehicle 10 may implement a user interface (UI) or user experience (UX) through the user interface device 200. The user interface device 200 may include an input device, an output device, and a user monitoring device.

2) Object Detection Device

The object detection device 210 may generate information about an object outside the vehicle 10. The object information may include at least one of information about the presence of the object, information about the location of the object, information about the distance between the vehicle 10 and the object, and information about the relative speed of the vehicle 10 with respect to the object. The object detection device 210 may detect the object outside the vehicle 10. The object detection device 210 may include at least one sensor to detect the object outside the vehicle 10. The object detection device 210 may include at least one of a camera, a radar, a lidar, an ultrasonic sensor, and an infrared sensor. The object detection device 210 may provide data about the object, which is created based on a sensing signal generated by the sensor, to at least one electronic device included in the vehicle 10.

2.1) Camera

The camera may generate information about an object outside the vehicle 10 with an image. The camera may include at least one lens, at least one image sensor, and at least one processor electrically connected to the image sensor and configured to process a received signal and generate data about the object based on the processed signal.

The camera may be at least one of a mono camera, a stereo camera, and an around view monitoring (AVM) camera. The camera may acquire information about the location of the object, information about the distance to the object, or information about the relative speed thereof with respect to the object based on various image processing algorithms. For example, the camera may acquire the information about the distance to the object and the information about the relative speed with respect to the object from the image based on a change in the size of the object over time. For example, the camera may acquire the information about the distance to the object and the information about the relative speed with respect to the object through a pin-hole model, road profiling, etc. For example, the camera may acquire the information about the distance to the object and the information about the relative speed with respect to the object from a stereo image generated by a stereo camera based on disparity information.

The camera may be disposed at a part of the vehicle 10 where the field of view (FOV) is guaranteed to photograph the outside of the vehicle 10. The camera may be disposed close to a front windshield inside the vehicle 10 to acquire front-view images of the vehicle 10. The camera may be disposed in the vicinity of a front bumper or a radiator grill. The camera may be disposed close to a rear glass inside the vehicle 10 to acquire rear-view images of the vehicle 10. The camera may be disposed in the vicinity of a rear bumper, a trunk, or a tail gate. The camera may be disposed close to at least one of side windows inside the vehicle 10 in order to acquire side-view images of the vehicle 10. Alternatively, the camera may be disposed in the vicinity of a side mirror, a fender, or a door.

2.2) Radar

The radar may generate information about an object outside the vehicle 10 using electromagnetic waves. The radar may include an electromagnetic wave transmitter, an electromagnetic wave receiver, and at least one processor electrically connected to the electromagnetic wave transmitter and the electromagnetic wave receiver and configured to process a received signal and generate data about the object based on the processed signal. The radar may be a pulse radar or a continuous wave radar depending on electromagnetic wave emission. The continuous wave radar may be a frequency modulated continuous wave (FMCW) radar or a frequency shift keying (FSK) radar depending on signal waveforms. The radar may detect the object from the electromagnetic waves based on the time of flight (TOF) or phase shift principle and obtain the location of the detected object, the distance to the detected object, and the relative speed with respect to the detected object. The radar may be disposed at an appropriate position outside the vehicle 10 to detect objects placed in front, rear, or side of the vehicle 10.

2.3) Lidar

The lidar may generate information about an object outside the vehicle 10 using a laser beam. The lidar may include a light transmitter, a light receiver, and at least one processor electrically connected to the light transmitter and the light receiver and configured to process a received signal and generate data about the object based on the processed signal. The lidar may operate based on the TOF or phase shift principle. The lidar may be a driven type or a non-driven type. The driven type of lidar may be rotated by a motor and detect an object around the vehicle 10. The non-driven type of lidar may detect an object within a predetermined range from the vehicle 10 based on light steering. The vehicle 10 may include a plurality of non-driven type of lidars. The lidar may detect the object from the laser beam based on the TOF or phase shift principle and obtain the location of the detected object, the distance to the detected object, and the relative speed with respect to the detected object. The lidar may be disposed at an appropriate position outside the vehicle 10 to detect objects placed in front, rear, or side of the vehicle 10.

3) Communication Device

The communication device 220 may exchange a signal with a device outside the vehicle 10. The communication device 220 may exchange a signal with at least one of an infrastructure (e.g., server, broadcast station, etc.), another vehicle, and a terminal. The communication device 220 may include a transmission antenna, a reception antenna, and at least one of a radio frequency (RF) circuit and an RF element where various communication protocols may be implemented to perform communication.

For example, the communication device 220 may exchange a signal with an external device based on the cellular vehicle-to-everything (C-V2X) technology. The C-V2X technology may include LTE-based sidelink communication and/or NR-based sidelink communication. Details related to the C-V2X technology will be described later.

The communication device 220 may exchange the signal with the external device according to dedicated short-range communications (DSRC) technology or wireless access in vehicular environment (WAVE) standards based on IEEE 802.11p PHY/MAC layer technology and IEEE 1609 Network/Transport layer technology. The DSRC technology (or WAVE standards) is communication specifications for providing intelligent transport system (ITS) services through dedicated short-range communication between vehicle-mounted devices or between a road side unit and a vehicle-mounted device. The DSRC technology may be a communication scheme that allows the use of a frequency of 5.9 GHz and has a data transfer rate in the range of 3 Mbps to 27 Mbps. IEEE 802.11p may be combined with IEEE 1609 to support the DSRC technology (or WAVE standards).

According to the present disclosure, the communication device 220 may exchange the signal with the external device according to either the C-V2X technology or the DSRC technology. Alternatively, the communication device 220 may exchange the signal with the external device by combining the C-V2X technology and the DSRC technology.

4) Driving Operation Device

The driving operation device 230 is configured to receive a user input for driving. In a manual mode, the vehicle 10 may be driven based on a signal provided by the driving operation device 230. The driving operation device 230 may include a steering input device (e.g., steering wheel), an acceleration input device (e.g., acceleration pedal), and a brake input device (e.g., brake pedal).

5) Main ECU

The main ECU 240 may control the overall operation of at least one electronic device included in the vehicle 10.

6) Driving Control Device

The driving control device 250 is configured to electrically control various vehicle driving devices included in the vehicle 10. The driving control device 250 may include a power train driving control device, a chassis driving control device, a door/window driving control device, a safety driving control device, a lamp driving control device, and an air-conditioner driving control device. The power train driving control device may include a power source driving control device and a transmission driving control device. The chassis driving control device may include a steering driving control device, a brake driving control device, and a suspension driving control device. The safety driving control device may include a seat belt driving control device for seat belt control.

The driving control device 250 includes at least one electronic control device (e.g., control ECU).

The driving control device 250 may control the vehicle driving device based on a signal received from the autonomous driving device 260. For example, the driving control device 250 may control a power train, a steering, and a brake based on signals received from the autonomous driving device 260.

7) Autonomous Driving Device

The autonomous driving device 260 may generate a route for autonomous driving based on obtained data. The autonomous driving device 260 may generate a driving plan for traveling along the generated route. The autonomous driving device 260 may generate a signal for controlling the movement of the vehicle 10 according to the driving plan. The autonomous driving device 260 may provide the generated signal to the driving control device 250.

The autonomous driving device 260 may implement at least one advanced driver assistance system (ADAS) function. The ADAS may implement at least one of adaptive cruise control (ACC), autonomous emergency braking (AEB), forward collision warning (FCW), lane keeping assist (LKA), lane change assist (LCA), target following assist (TFA), blind spot detection (BSD), high beam assist (HBA), auto parking system (APS), PD collision warning system, traffic sign recognition (TSR), traffic sign assist (TSA), night vision (NV), driver status monitoring (DSM), and traffic fam assist (TJA).

The autonomous driving device 260 may perform switching from an autonomous driving mode to a manual driving mode or switching from the manual driving mode to the autonomous driving mode. For example, the autonomous driving device 260 may switch the mode of the vehicle 10 from the autonomous driving mode to the manual driving mode or from the manual driving mode to the autonomous driving mode based on a signal received from the user interface device 200.

8) Sensing Unit

The sensing unit 270 may detect the state of the vehicle 10. The sensing unit 270 may include at least one of an inertial measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include at least one of an acceleration sensor, a gyro sensor, and a magnetic sensor.

The sensing unit 270 may generate data about the vehicle state based on a signal generated by at least one sensor. The vehicle state data may be information generated based on data detected by various sensors included in the vehicle 10. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data on pressure applied to the acceleration pedal, data on pressure applied to the brake pedal, etc.

9) Location Data Generating Device

The location data generating device 280 may generate data on the location of the vehicle 10. The location data generating device 280 may include at least one of a global positioning system (GPS) and a differential global positioning system (DGPS). The location data generating device 280 may generate the location data on the vehicle 10 based on a signal generated by at least one of the GPS and the DGPS. In some implementations, the location data generating device 280 may correct the location data based on at least one of the IMU sensor of the sensing unit 270 and the camera of the object detection device 210. The location data generating device 280 may also be called a global navigation satellite system (GNSS).

The vehicle 10 may include an internal communication system 50. The plurality of electronic devices included in the vehicle 10 may exchange a signal through the internal communication system 50. The signal may include data. The internal communication system 50 may use at least one communication protocol (e.g., CAN, LIN, FlexRay, MOST, or Ethernet).

(3) Components of Autonomous Driving Device

Figure 3:
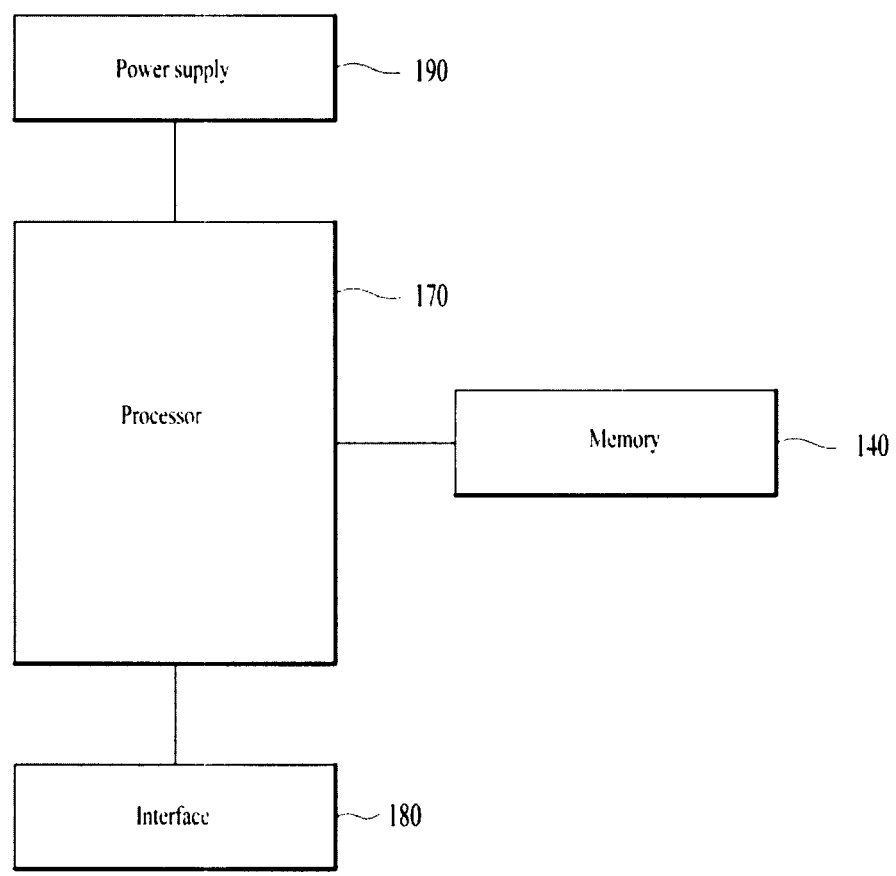
FIG. 3 is a control block view illustrating an autonomous driving device according to the embodiment of the present disclosure.

FIG. 3 is a control block diagram of the autonomous driving device 260 according to an implementation of the present disclosure.

Referring to FIG. 3, the autonomous driving device 260 may include a memory 140, a processor 170, an interface 180 and a power supply 190.

The memory 140 is electrically connected to the processor 170. The memory 140 may store basic data about a unit, control data for controlling the operation of the unit, and input/output data. The memory 140 may store data processed by the processor 170. In hardware implementation, the memory 140 may be implemented as any one of a ROM, a RAM, an EPROM, a flash drive, and a hard drive. The memory 140 may store various data for the overall operation of the autonomous driving device 260, such as a program for processing or controlling the processor 170. The memory 140 may be integrated with the processor 170. In some implementations, the memory 140 may be classified as a subcomponent of the processor 170.

The interface 180 may exchange a signal with at least one electronic device included in the vehicle 10 by wire or wirelessly. The interface 180 may exchange a signal with at least one of the object detection device 210, the communication device 220, the driving operation device 230, the main ECU 240, the driving control device 250, the sensing unit 270, and the location data generating device 280 by wire or wirelessly. The interface 180 may be implemented with at least one of a communication module, a terminal, a pin, a cable, a port, a circuit, an element, and a device.

The power supply 190 may provide power to the autonomous driving device 260. The power supply 190 may be provided with power from a power source (e.g., battery) included in the vehicle 10 and supply the power to each unit of the autonomous driving device 260. The power supply 190 may operate according to a control signal from the main ECU 240. The power supply 190 may include a switched-mode power supply (SMPS).

The processor 170 may be electrically connected to the memory 140, the interface 180, and the power supply 190 to exchange signals with the components. The processor 170 may be implemented with at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 may be driven by power supplied from the power supply 190. The processor 170 may receive data, process the data, generate a signal, and provide the signal while the power is supplied thereto.

The processor 170 may receive information from other electronic devices included in the vehicle 10 through the interface 180. The processor 170 may provide a control signal to other electronic devices in the vehicle 10 through the interface 180.

The autonomous driving device 260 may include at least one printed circuit board (PCB). The memory 140, the interface 180, the power supply 190, and the processor 170 may be electrically connected to the PCB.

(4) Operation of Autonomous Driving Device

1) Receiving Operation

Figure 4:
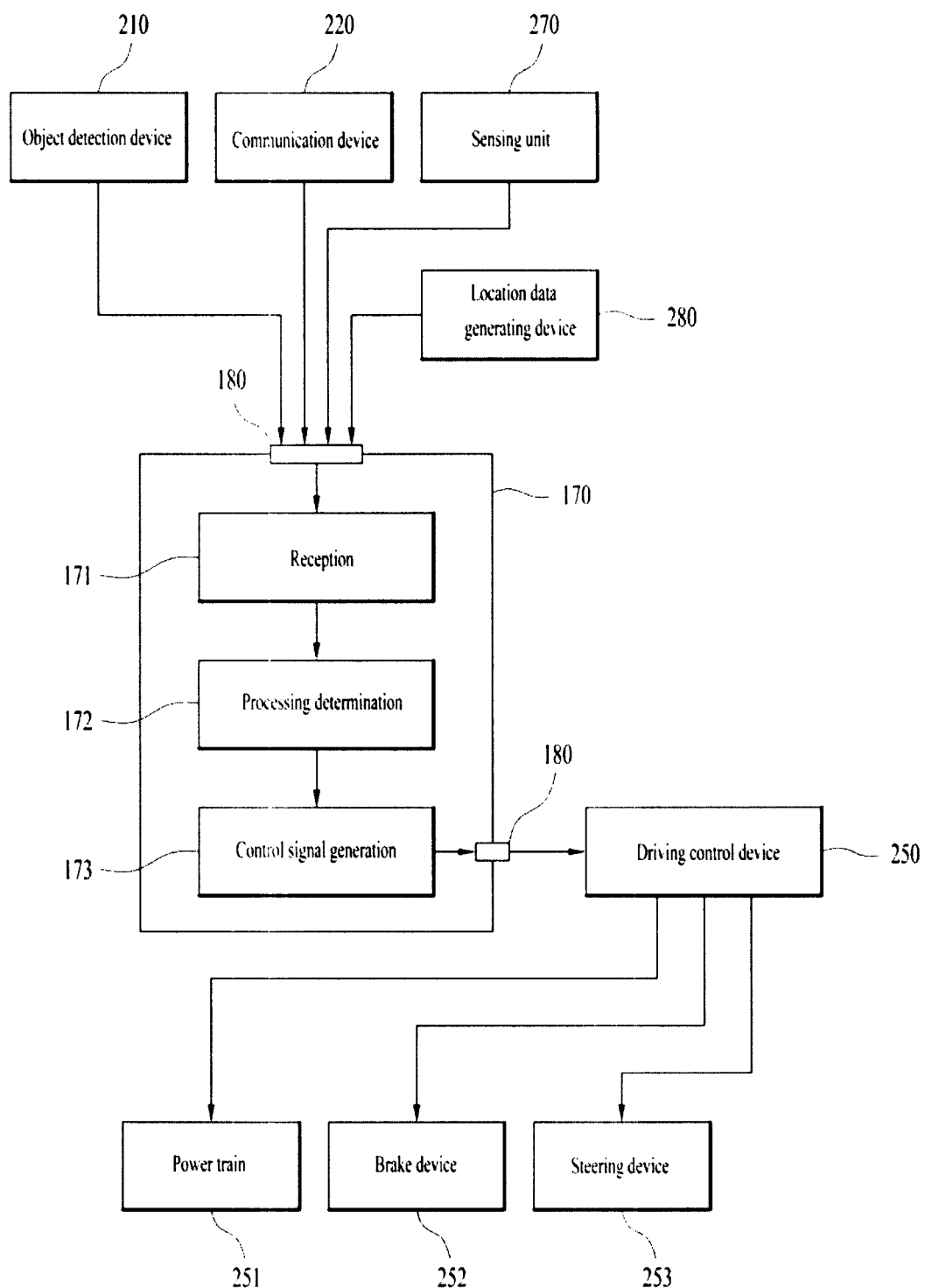
FIG. 4 is a block view illustrating an autonomous driving device according to the embodiment of the present disclosure.

Referring to FIG. 4, the processor 170 may perform a receiving operation. The processor 170 may receive data from at least one of the object detection device 210, the communication device 220, the sensing unit 270, and the location data generating device 280 through the interface 180. The processor 170 may receive object data from the object detection device 210. The processor 170 may receive HD map data from the communication device 220. The processor 170 may receive vehicle state data from the sensing unit 270. The processor 170 may receive location data from the location data generating device 280.

2) Processing/Determination Operation

The processor 170 may perform a processing/determination operation. The processor 170 may perform the processing/determination operation based on driving state information. The processor 170 may perform the processing/determination operation based on at least one of object data, HD map data, vehicle state data, and location data.

2.1) Driving Plan Data Generating Operation

The processor 170 may generate driving plan data. For example, the processor 170 may generate electronic horizon data. The electronic horizon data may be understood as driving plan data from the current location of the vehicle 10 to the horizon. The horizon may be understood as a point away from the current location of the vehicle 10 by a predetermined distance along a predetermined traveling route. Further, the horizon may refer to a point at which the vehicle 10 may arrive after a predetermined time from the current location of the vehicle 10 along the predetermined traveling route.

The electronic horizon data may include horizon map data and horizon path data.

2.1.1) Horizon Map Data

The horizon map data may include at least one of topology data, road data, HD map data and dynamic data. In some implementations, the horizon map data may include a plurality of layers. For example, the horizon map data may include a first layer matching with the topology data, a second layer matching with the road data, a third layer matching with the HD map data, and a fourth layer matching with the dynamic data. The horizon map data may further include static object data.

The topology data may be understood as a map created by connecting road centers with each other. The topology data is suitable for representing an approximate location of a vehicle and may have a data form used for navigation for drivers. The topology data may be interpreted as data about roads without vehicles. The topology data may be generated on the basis of data received from an external server through the communication device 220. The topology data may be based on data stored in at least one memory included in the vehicle 10.

The road data may include at least one of road slope data, road curvature data, and road speed limit data. The road data may further include no-passing zone data. The road data may be based on data received from an external server through the communication device 220. The road data may be based on data generated by the object detection device 210.

The HD map data may include detailed topology information including road lanes, connection information about each lane, and feature information for vehicle localization (e.g., traffic sign, lane marking/property, road furniture, etc.). The HD map data may be based on data received from an external server through the communication device 220.

The dynamic data may include various types of dynamic information on roads. For example, the dynamic data may include construction information, variable speed road information, road condition information, traffic information, moving object information, etc. The dynamic data may be based on data received from an external server through the communication device 220. The dynamic data may be based on data generated by the object detection device 210.

The processor 170 may provide map data from the current location of the vehicle 10 to the horizon.

2.1.2) Horizon Path Data

The horizon path data may be understood as a potential trajectory of the vehicle 10 when the vehicle 10 travels from the current location of the vehicle 10 to the horizon. The horizon path data may include data indicating the relative probability of selecting a road at the decision point (e.g., fork, junction, crossroad, etc.). The relative probability may be calculated on the basis of the time taken to arrive at the final destination. For example, if the time taken to arrive at the final destination when a first road is selected at the decision point is shorter than that when a second road is selected, the probability of selecting the first road may be calculated to be higher than the probability of selecting the second road.

The horizon path data may include a main path and a sub-path. The main path may be understood as a trajectory obtained by connecting roads that are highly likely to be selected. The sub-path may be branched from at least one decision point on the main path. The sub-path may be understood as a trajectory obtained by connecting one or more roads that are less likely to be selected at the at least one decision point on the main path.

3) Control Signal Generating Operation

The processor 170 may perform a control signal generating operation. The processor 170 may generate a control signal on the basis of the electronic horizon data. For example, the processor 170 may generate at least one of a power train control signal, a brake device control signal, and a steering device control signal on the basis of the electronic horizon data.

The processor 170 may transmit the generated control signal to the driving control device 250 through the interface 180. The driving control device 250 may forward the control signal to at least one of a power train 251, a brake device 252 and a steering device 253.

2. Cabin

Figure 5:
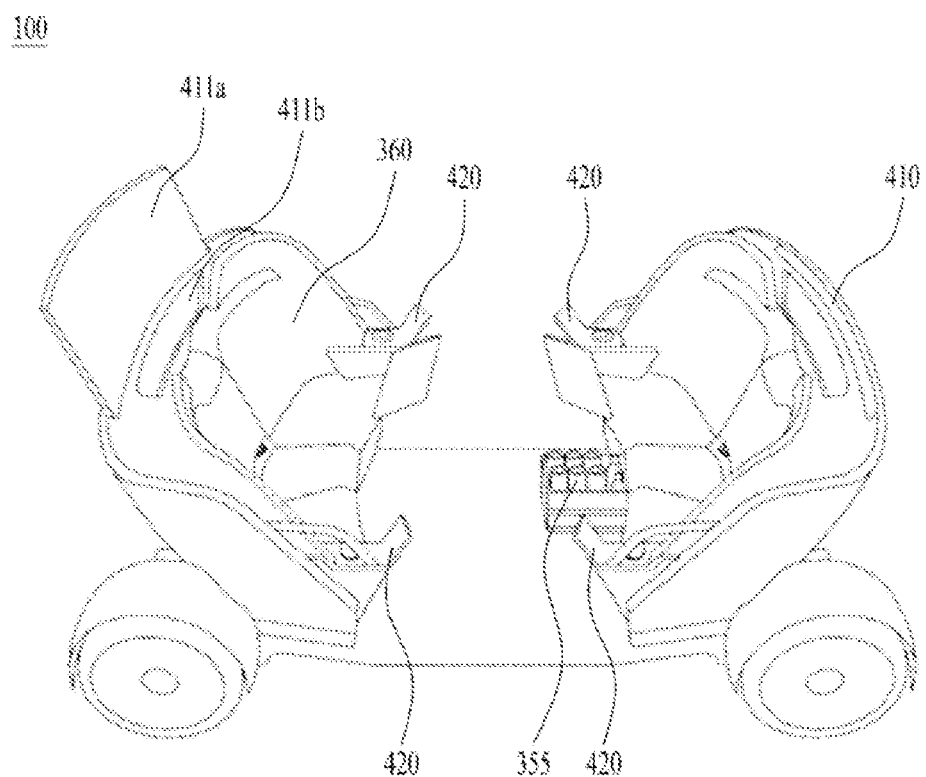
FIG. 5 is a view illustrating the inside of a vehicle according to the embodiment of the present disclosure.

FIG. 5 is a diagram showing the interior of the vehicle 10 according to an implementation of the present disclosure.

Figure 6:
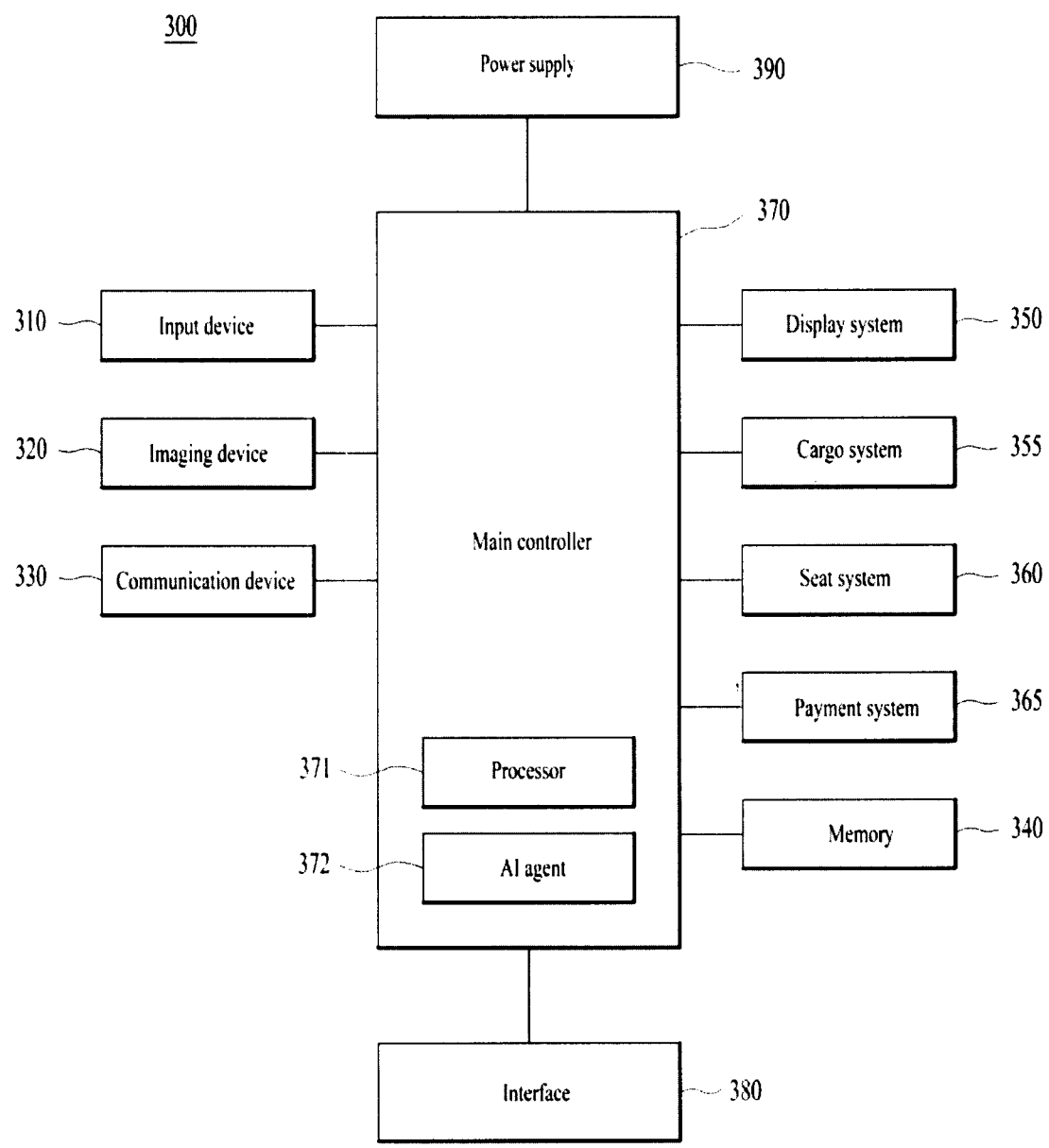
FIG. 6 is a block view illustrating a cabin system for a vehicle according to the embodiment of the present disclosure.

FIG. 6 is a block diagram for explaining a vehicle cabin system according to an implementation of the present disclosure.

Referring to FIGS. 5 and 6, a vehicle cabin system 300 (cabin system) may be defined as a convenience system for the user who uses the vehicle 10. The cabin system 300 may be understood as a high-end system including a display system 350, a cargo system 355, a seat system 360, and a payment system 365. The cabin system 300 may include a main controller 370, a memory 340, an interface 380, a power supply 390, an input device 310, an imaging device 320, a communication device 330, the display system 350, the cargo system 355, the seat system 360, and the payment system 365. In some implementations, the cabin system 300 may further include components in addition to the components described in this specification or may not include some of the components described in this specification.

1) Main Controller

The main controller 370 may be electrically connected to the input device 310, the communication device 330, the display system 350, the cargo system 355, the seat system 360, and the payment system 365 and exchange signals with the components. The main controller 370 may control the input device 310, the communication device 330, the display system 350, the cargo system 355, the seat system 360, and the payment system 365. The main controller 370 may be implemented with at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The main controller 370 may include at least one sub-controller. In some implementations, the main controller 370 may include a plurality of sub-controllers. The plurality of sub-controllers may control the devices and systems included in the cabin system 300, respectively. The devices and systems included in the cabin system 300 may be grouped by functions or grouped with respect to seats for users.

The main controller 370 may include at least one processor 371. Although FIG. 6 illustrates the main controller 370 including a single processor 371, the main controller 371 may include a plurality of processors 371. The processor 371 may be classified as one of the above-described sub-controllers.

The processor 371 may receive signals, information, or data from a user terminal through the communication device 330. The user terminal may transmit signals, information, or data to the cabin system 300.

The processor 371 may identify the user on the basis of image data received from at least one of an internal camera and an external camera included in the imaging device 320. The processor 371 may identify the user by applying an image processing algorithm to the image data. For example, the processor 371 may identify the user by comparing information received from the user terminal with the image data. For example, the information may include information about at least one of the route, body, fellow passenger, baggage, location, preferred content, preferred food, disability, and use history of the user.

The main controller 370 may include an artificial intelligence agent 372. The artificial intelligence agent 372 may perform machine learning on the basis of data acquired from the input device 310. The artificial intelligence agent 372 may control at least one of the display system 350, the cargo system 355, the seat system 360, and the payment system 365 on the basis of machine learning results.

2) Essential Components

The memory 340 is electrically connected to the main controller 370. The memory 340 may store basic data about a unit, control data for controlling the operation of the unit, and input/output data. The memory 340 may store data processed by the main controller 370. In hardware implementation, the memory 140 may be implemented as any one of a ROM, a RAM, an EPROM, a flash drive, and a hard drive. The memory 340 may store various types of data for the overall operation of the cabin system 300, such as a program for processing or controlling the main controller 370. The memory 340 may be integrated with the main controller 370.

The interface 380 may exchange a signal with at least one electronic device included in the vehicle 10 by wire or wirelessly. The interface 380 may be implemented with at least one of a communication module, a terminal, a pin, a cable, a port, a circuit, an element and a device.

The power supply 390 may provide power to the cabin system 300. The power supply 390 may be provided with power from a power source (e.g., battery) included in the vehicle 10 and supply the power to each unit of the cabin system 300. The power supply 390 may operate according to a control signal from the main controller 370. For example, the power supply 390 may be implemented as a SMPS.

The cabin system 300 may include at least one PCB. The main controller 370, the memory 340, the interface 380, and the power supply 390 may be mounted on at least one PCB.

3) Input Device

The input device 310 may receive a user input. The input device 310 may convert the user input into an electrical signal. The electrical signal converted by the input device 310 may be converted into a control signal and provided to at least one of the display system 350, the cargo system 355, the seat system 360, and the payment system 365. The main controller 370 or at least one processor included in the cabin system 300 may generate a control signal based on an electrical signal received from the input device 310.

The input device 310 may include at least one of a touch input unit, a gesture input unit, a mechanical input unit, and a voice input unit. The touch input unit may convert a touch input from the user into an electrical signal. The touch input unit may include at least one touch sensor to detect the user's touch input. In some implementations, the touch input unit may be implemented as a touch screen by integrating the touch input unit with at least one display included in the display system 350. Such a touch screen may provide both an input interface and an output interface between the cabin system 300 and the user. The gesture input unit may convert a gesture input from the user into an electrical signal. The gesture input unit may include at least one of an infrared sensor and an image sensor to detect the user's gesture input. In some implementations, the gesture input unit may detect a three-dimensional gesture input from the user. To this end, the gesture input unit may include a plurality of light output units for outputting infrared light or a plurality of image sensors. The gesture input unit may detect the user's three-dimensional gesture input based on the TOF, structured light, or disparity principle. The mechanical input unit may convert a physical input (e.g., press or rotation) from the user through a mechanical device into an electrical signal. The mechanical input unit may include at least one of a button, a dome switch, a jog wheel, and a jog switch. Meanwhile, the gesture input unit and the mechanical input unit may be integrated. For example, the input device 310 may include a jog dial device that includes a gesture sensor and is formed such that jog dial device may be inserted/ejected into/from a part of a surrounding structure (e.g., at least one of a seat, an armrest, and a door). When the jog dial device is parallel to the surrounding structure, the jog dial device may serve as the gesture input unit. When the jog dial device protrudes from the surrounding structure, the jog dial device may serve as the mechanical input unit. The voice input unit may convert a user's voice input into an electrical signal. The voice input unit may include at least one microphone. The voice input unit may include a beamforming MIC.

4) Imaging Device

The imaging device 320 may include at least one camera. The imaging device 320 may include at least one of an internal camera and an external camera. The internal camera may capture an image of the inside of the cabin. The external camera may capture an image of the outside of the vehicle 10. The internal camera may obtain the image of the inside of the cabin. The imaging device 320 may include at least one internal camera. It is desirable that the imaging device 320 includes as many cameras as the maximum number of passengers in the vehicle 10. The imaging device 320 may provide an image obtained by the internal camera. The main controller 370 or at least one processor included in the cabin system 300 may detect the motion of the user from the image acquired by the internal camera, generate a signal on the basis of the detected motion, and provide the signal to at least one of the display system 350, the cargo system 355, the seat system 360, and the payment system 365. The external camera may obtain the image of the outside of the vehicle 10. The imaging device 320 may include at least one external camera. It is desirable that the imaging device 320 include as many cameras as the maximum number of passenger doors. The imaging device 320 may provide an image obtained by the external camera. The main controller 370 or at least one processor included in the cabin system 300 may acquire user information from the image acquired by the external camera. The main controller 370 or at least one processor included in the cabin system 300 may authenticate the user or obtain information about the user body (e.g., height, weight, etc.), information about fellow passengers, and information about baggage from the user information.

5) Communication Device

The communication device 330 may exchange a signal with an external device wirelessly. The communication device 330 may exchange the signal with the external device through a network or directly. The external device may include at least one of a server, a mobile terminal, and another vehicle. The communication device 330 may exchange a signal with at least one user terminal. To perform communication, the communication device 330 may include an antenna and at least one of an RF circuit and element capable of at least one communication protocol. In some implementations, the communication device 330 may use a plurality of communication protocols. The communication device 330 may switch the communication protocol depending on the distance to a mobile terminal.

For example, the communication device 330 may exchange the signal with the external device based on the C-V2X technology. The C-V2X technology may include LTE-based sidelink communication and/or NR-based sidelink communication. Details related to the C-V2X technology will be described later.

The communication device 220 may exchange the signal with the external device according to DSRC technology or WAVE standards based on IEEE 802.11p PHY/MAC layer technology and IEEE 1609 Network/Transport layer technology. The DSRC technology (or WAVE standards) is communication specifications for providing ITS services through dedicated short-range communication between vehicle-mounted devices or between a road side unit and a vehicle-mounted device. The DSRC technology may be a communication scheme that allows the use of a frequency of 5.9 GHz and has a data transfer rate in the range of 3 Mbps to 27 Mbps. IEEE 802.11p may be combined with IEEE 1609 to support the DSRC technology (or WAVE standards).

According to the present disclosure, the communication device 330 may exchange the signal with the external device according to either the C-V2X technology or the DSRC technology. Alternatively, the communication device 330 may exchange the signal with the external device by combining the C-V2X technology and the DSRC technology.

6) Display System

The display system 350 may display a graphic object. The display system 350 may include at least one display device. For example, the display system 350 may include a first display device 410 for common use and a second display device 420 for individual use.

6.1) Common Display Device

The first display device 410 may include at least one display 411 to display visual content. The display 411 included in the first display device 410 may be implemented with at least one of a flat display, a curved display, a rollable display, and a flexible display. For example, the first display device 410 may include a first display 411 disposed behind a seat and configured to be inserted/ejected into/from the cabin, and a first mechanism for moving the first display 411. The first display 411 may be disposed such that the first display 411 is capable of being inserted/ejected into/from a slot formed in a seat main frame. In some implementations, the first display device 410 may further include a mechanism for controlling a flexible part. The first display 411 may be formed to be flexible, and a flexible part of the first display 411 may be adjusted depending on the position of the user. For example, the first display device 410 may be disposed on the ceiling of the cabin and include a second display formed to be rollable and a second mechanism for rolling and releasing the second display. The second display may be formed such that images may be displayed on both sides thereof. For example, the first display device 410 may be disposed on the ceiling of the cabin and include a third display formed to be flexible and a third mechanism for bending and unbending the third display. In some implementations, the display system 350 may further include at least one processor that provides a control signal to at least one of the first display device 410 and the second display device 420. The processor included in the display system 350 may generate a control signal based on a signal received from at last one of the main controller 370, the input device 310, the imaging device 320, and the communication device 330.

The display area of a display included in the first display device 410 may be divided into a first area 411*a* and a second area 411*b*. The first area 411*a* may be defined as a content display area. For example, at least one of graphic objects corresponding to display entertainment content (e.g., movies, sports, shopping, food, etc.), video conferences, food menus, and augmented reality images may be displayed in the first area 411. Further, a graphic object corresponding to driving state information about the vehicle 10 may be displayed in the first area 411*a*. The driving state information may include at least one of information about an object outside the vehicle 10, navigation information, and vehicle state information. The object information may include at least one of information about the presence of the object, information about the location of the object, information about the distance between the vehicle 10 and the object, and information about the relative speed of the vehicle 10 with respect to the object. The navigation information may include at least one of map information, information about a set destination, information about a route to the destination, information about various objects on the route, lane information, and information on the current location of the vehicle 10. The vehicle state information may include vehicle attitude information, vehicle speed information, vehicle tilt information, vehicle weight information, vehicle orientation information, vehicle battery information, vehicle fuel information, vehicle tire pressure information, vehicle steering information, vehicle internal temperature information, vehicle internal humidity information, pedal position information, vehicle engine temperature information, etc. The second area 411b may be defined as a user interface area. For example, an artificial intelligence agent screen may be displayed in the second area 411b. In some implementations, the second area 411b may be located in an area defined for a seat frame. In this case, the user may view content displayed in the second area 411b between seats. In some implementations, the first display device 410 may provide hologram content. For example, the first display device 410 may provide hologram content for each of a plurality of users so that only a user who requests the content may view the content.

6.2) Display Device for Individual Use

The second display device 420 may include at least one display 421. The second display device 420 may provide the display 421 at a position at which only each passenger may view display content. For example, the display 421 may be disposed on the armrest of the seat. The second display device 420 may display a graphic object corresponding to personal information about the user. The second display device 420 may include as many displays 421 as the maximum number of passengers in the vehicle 10. The second display device 420 may be layered or integrated with a touch sensor to implement a touch screen. The second display device 420 may display a graphic object for receiving a user input for seat adjustment or indoor temperature adjustment.

7) Cargo System

The cargo system 355 may provide items to the user according to the request from the user. The cargo system 355 may operate on the basis of an electrical signal generated by the input device 310 or the communication device 330. The cargo system 355 may include a cargo box. The cargo box may include the items and be hidden under the seat. When an electrical signal based on a user input is received, the cargo box may be exposed to the cabin. The user may select a necessary item from the items loaded in the cargo box. The cargo system 355 may include a sliding mechanism and an item pop-up mechanism to expose the cargo box according to the user input. The cargo system 355 may include a plurality of cargo boxes to provide various types of items. A weight sensor for determining whether each item is provided may be installed in the cargo box.

8) Seat System

The seat system 360 may customize the seat for the user. The seat system 360 may operate on the basis of an electrical signal generated by the input device 310 or the communication device 330. The seat system 360 may adjust at least one element of the seat by obtaining user body data. The seat system 360 may include a user detection sensor (e.g., pressure sensor) to determine whether the user sits on the seat. The seat system 360 may include a plurality of seats for a plurality of users. One of the plurality of seats may be disposed to face at least another seat. At least two users may sit while facing each other inside the cabin.

9) Payment System

The payment system 365 may provide a payment service to the user. The payment system 365 may operate on the basis of an electrical signal generated by the input device 310 or the communication device 330. The payment system 365 may calculate the price of at least one service used by the user and request the user to pay the calculated price.

3. C-V2X

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink refers to a communication scheme in which a direct link is established between user equipments (UEs) and the UEs directly exchange voice or data without intervention of a base station (BS). The sidelink is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). $3^{rd}$ generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, $5^{th}$ generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of the present disclosure is not limited thereto.

Figure 7:
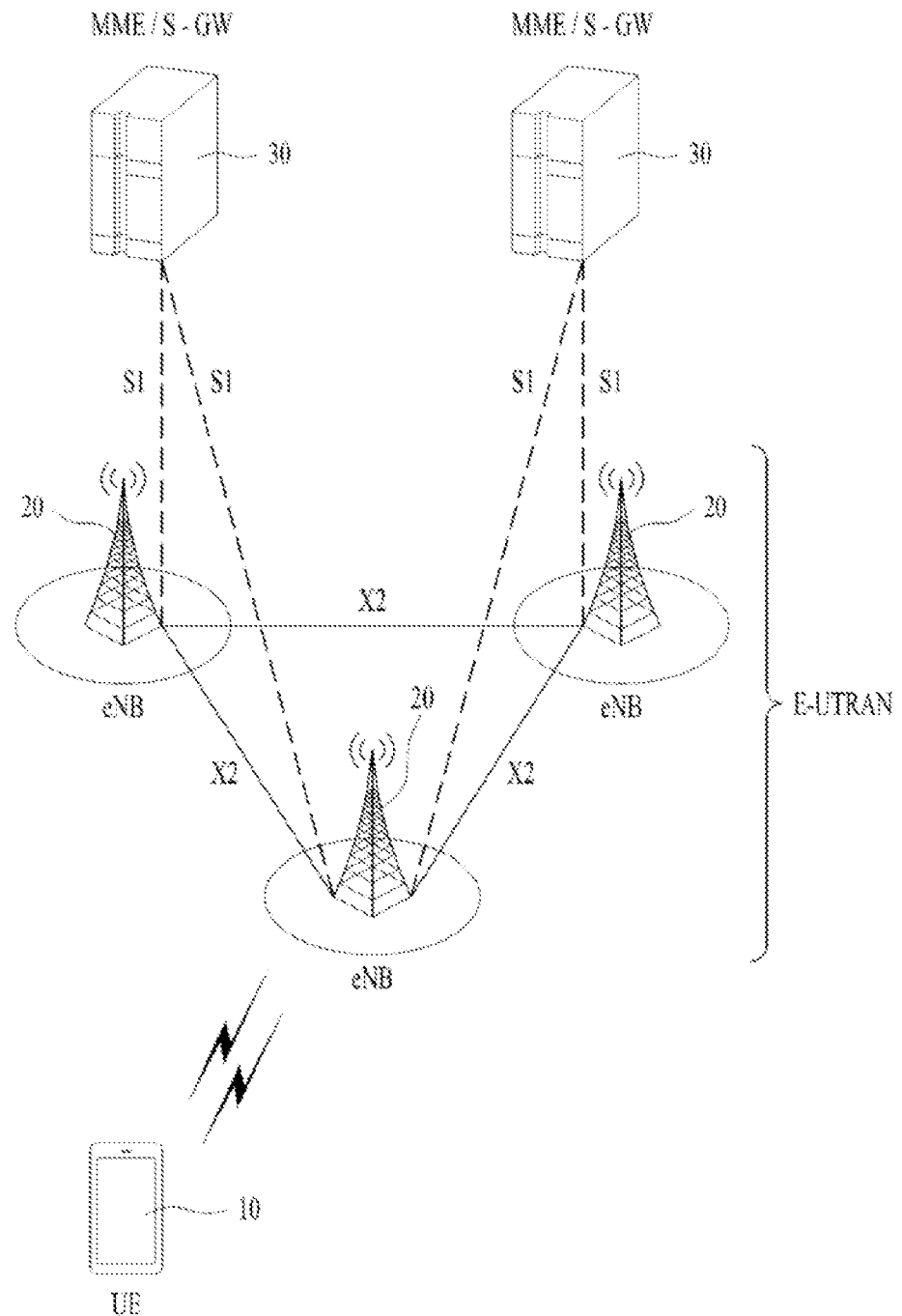
FIG. 7 illustrates a structure of an LTE system to which the present disclosure is applicable.

FIG. 7 illustrates the structure of an LTE system to which the present disclosure is applicable. This may also be called an evolved UMTS terrestrial radio access network (E-UTRAN) or LTE/LTE-A system.

Referring to FIG. 7, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 8:
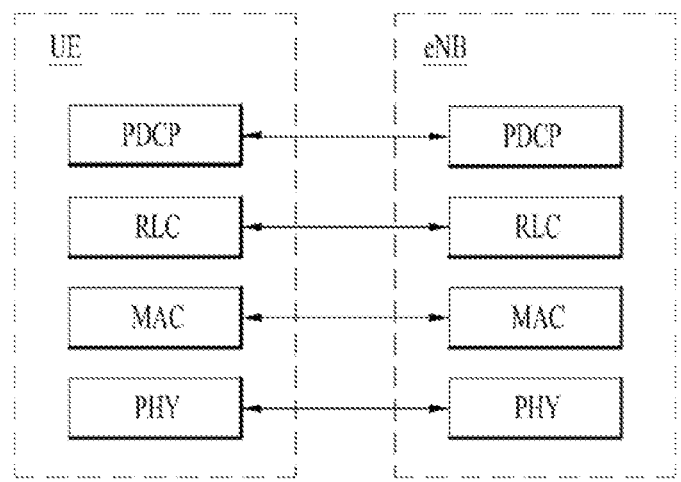
FIG. 8 illustrates a radio protocol architecture for a user plane to which the present disclosure is applicable.

FIG. 8 illustrates a user-plane radio protocol architecture to which the present disclosure is applicable.

Figure 9:
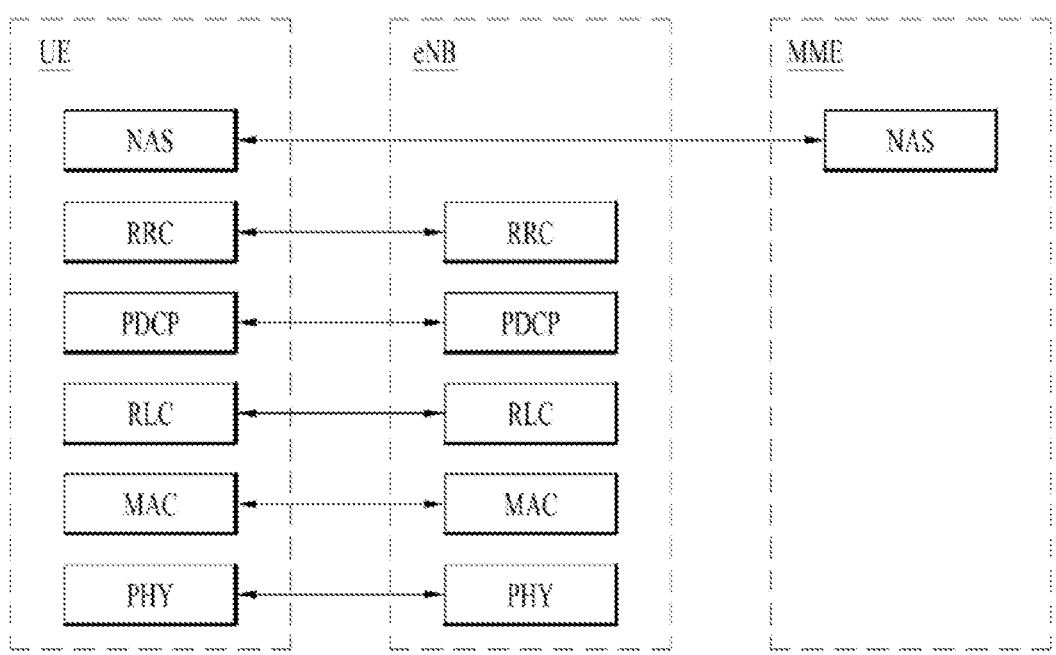
FIG. 9 illustrates a radio protocol architecture for a control plane to which the present disclosure is applicable.

FIG. 9 illustrates a control-plane radio protocol architecture to which the present disclosure is applicable. A user plane is a protocol stack for user data transmission, and a control plane is a protocol stack for control signal transmission.

Referring to FIGS. 8 and 9, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC CONNECTED state, and otherwise, the UE is placed in RRC IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbols in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 10:
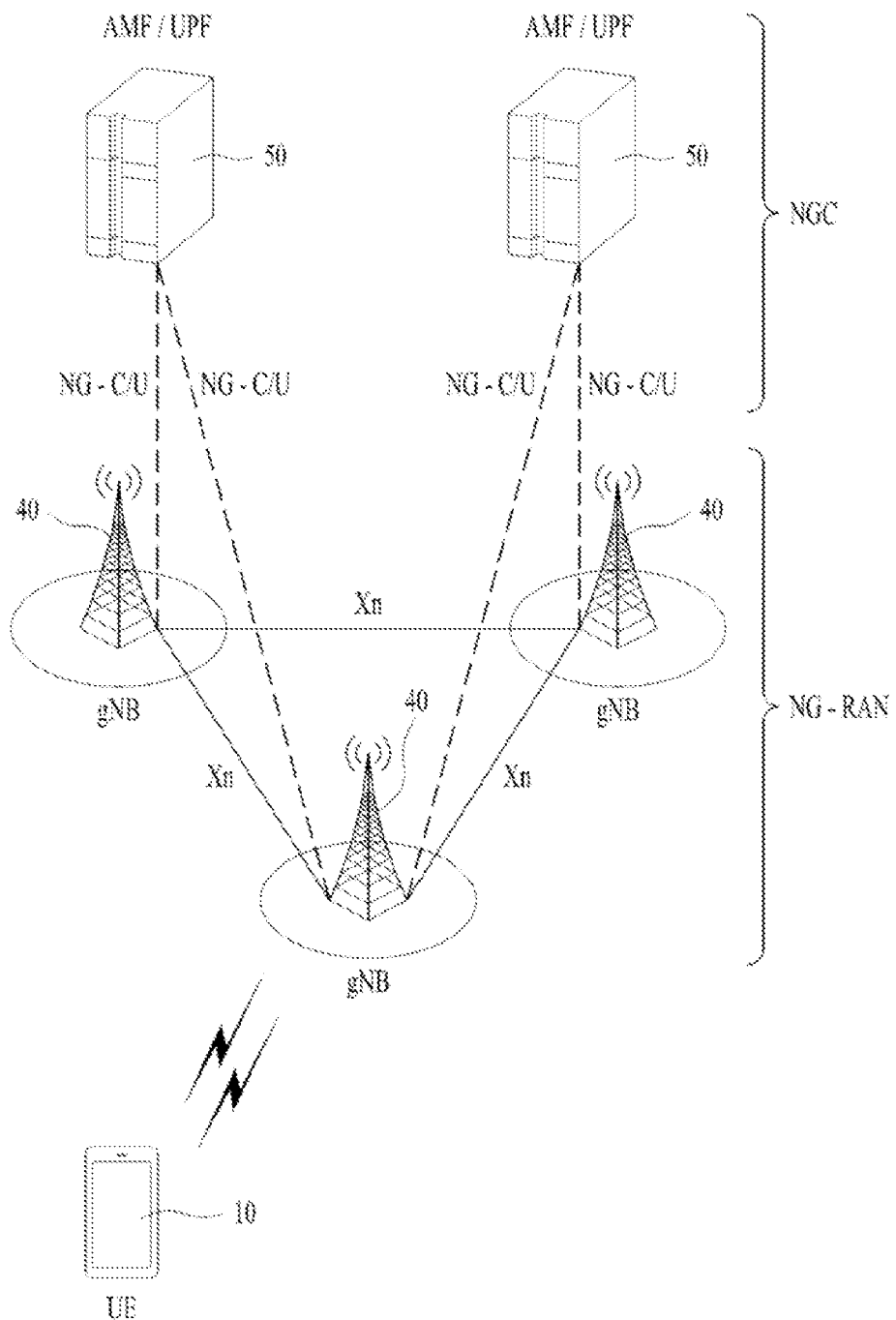
FIG. 10 illustrates a structure of an NR system to which the present disclosure is applicable.

FIG. 10 illustrates the structure of a NR system to which the present disclosure is applicable.

Referring to FIG. 10, a next generation radio access network (NG-RAN) may include a next generation Node B (gNB) and/or an eNB, which provides user-plane and control-plane protocol termination to a UE. In FIG. 10, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 11:
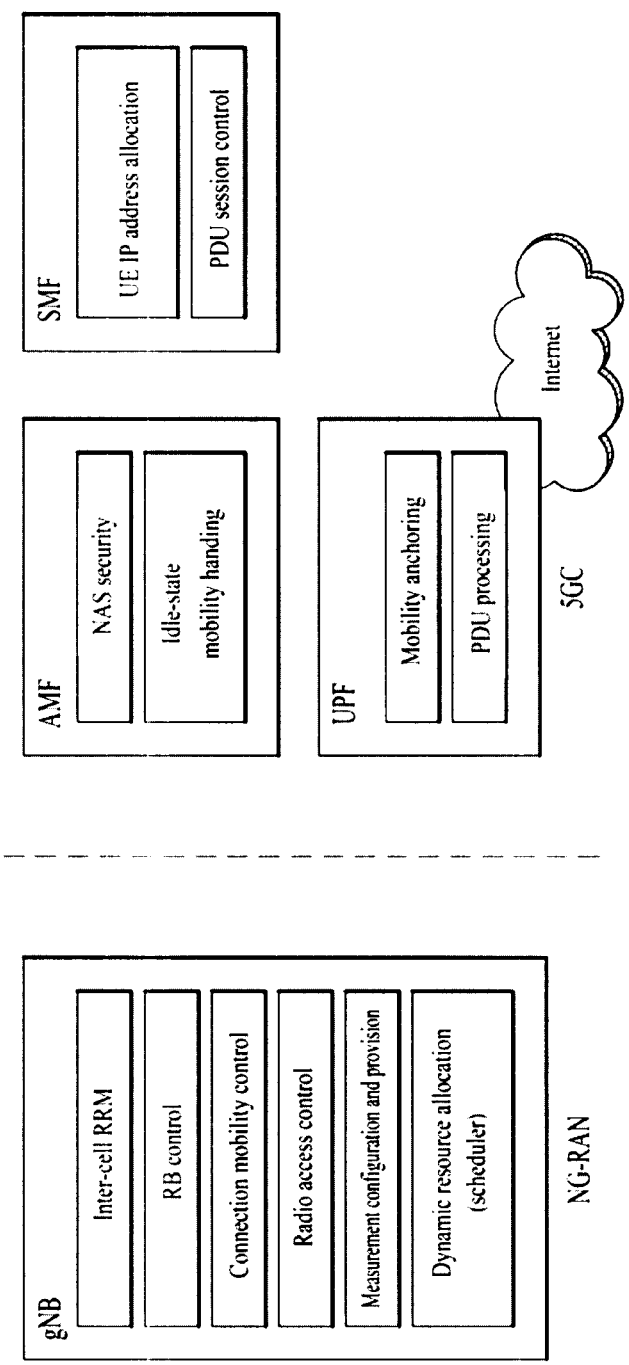
FIG. 11 illustrates functional division between NG-RAN and 5GC to which the present disclosure is applicable.

FIG. 11 illustrates functional split between the NG-RAN and the 5GC to which the present disclosure is applicable.

Referring to FIG. 11, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 12:
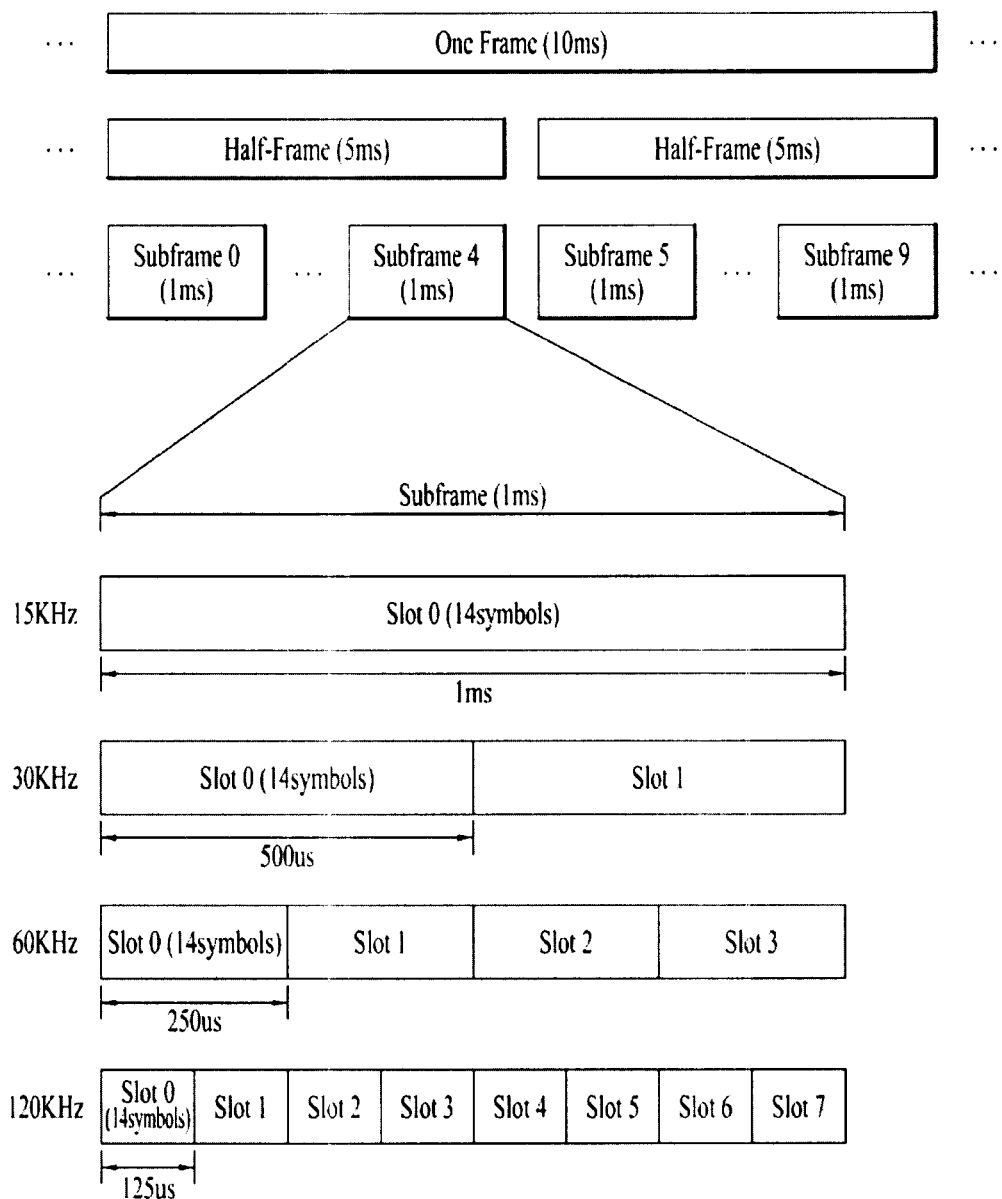
FIG. 12 illustrates a structure of a radio frame of an NR system to which the present disclosure is applicable.

FIG. 12 illustrates the structure of a NR radio frame to which the present disclosure is applicable.

Referring to FIG. 12, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration µ in the NCP case.

TABLE 1

| (15*2u) | SCS | $N^{slot}_{symb}$ | $N^{frame,u}_{slot}$ | $N^{subframe,u}_{slot}$ |
|---|---|---|---|---|
| (u = 0) | 15 KHz | 14 | 10 | 1 |
| (u = 1) | 30 KHz | 14 | 20 | 2 |
| (u = 2) | 60 KHz | 14 | 40 | 4 |
| (u = 3) | 120 KHz | 14 | 80 | 8 |
| (u = 4) | 240 KHz | 14 | 160 | 16 |

Table 2 below lists the number of symbols per slot, the number of slots per frame, and the number of slots per subframe according to an SCS in the ECP case.

TABLE 2

| (15*2^u) | SCS | $N^{slot}_{symb}$ | $N^{frame,u}_{slot}$ | $N^{subframe,u}_{slot}$ |
|---|---|---|---|---|
| (u = 2) | 60 KHz | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

Figure 13:
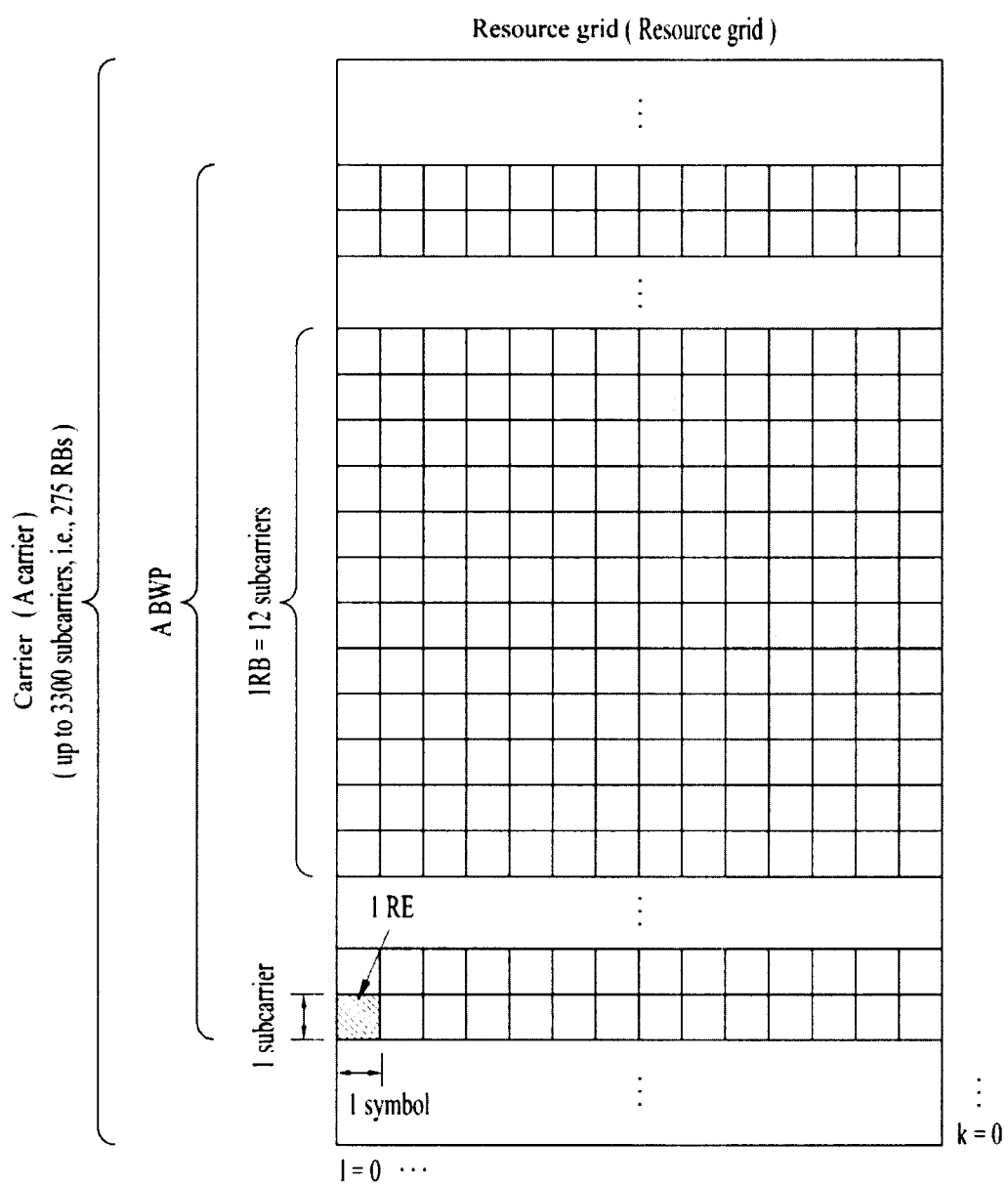
FIG. 13 illustrates a structure of a slot of an NR frame to which the present disclosure is applicable.

FIG. 13 illustrates the slot structure of a NR frame to which the present disclosure is applicable.

Referring to FIG. 13, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element is referred to as a resource element (RE), and one complex symbol may be mapped thereto.

Figure 14:
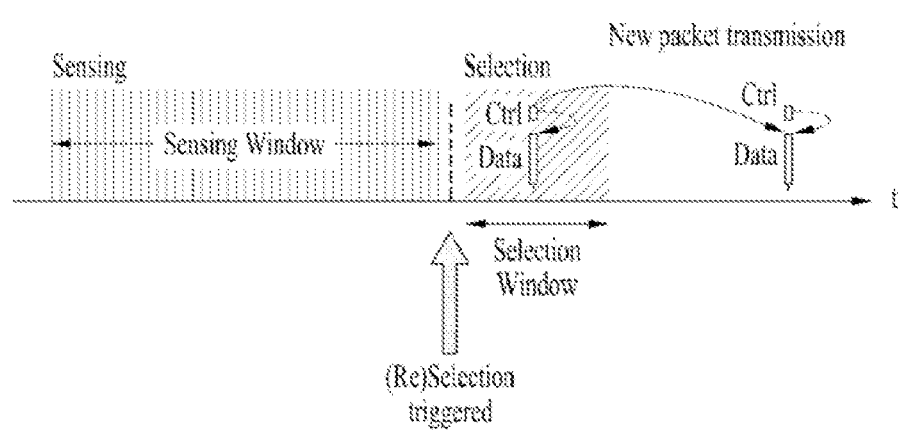
FIG. 14 illustrates an example of a reservation method of transmission resources of next packet in transmission resource selection.

As shown in FIG. 14, when transmission resources are selected, the transmission resource for a next packet may also be reserved.

FIG. 14 illustrates an example of transmission resource selection to which the present disclosure is applicable.

In V2X communication, transmission may be performed twice for each MAC PDU. For example, referring to FIG. 14, when resources for initial transmission are selected, resources for retransmission may also be reserved apart from the resources for initial transmission by a predetermined time gap. A UE may identify transmission resources reserved or used by other UEs through sensing in a sensing window, exclude the transmission resources from a selection window, and randomly select resources with less interference from among the remaining resources.

For example, the UE may decode a physical sidelink control channel (PSCCH) including information about the cycle of reserved resources within the sensing window and measure physical sidelink shared channel (PSSCH) reference signal received power (RSRP) on periodic resources determined based on the PSCCH. The UE may exclude resources with PSCCH RSRP more than a threshold from the selection window. Thereafter, the UE may randomly select sidelink resources from the remaining resources in the selection window.

Alternatively, the UE may measure received signal strength indication (RSSI) for the periodic resources in the sensing window and identify resources with less interference (for example, the bottom 20 percent). After selecting resources included in the selection window from among the periodic resources, the UE may randomly select sidelink resources from among the resources included in the selection window. For example, when the UE fails to decode the PSCCH, the UE may apply the above-described method.

Figure 15:
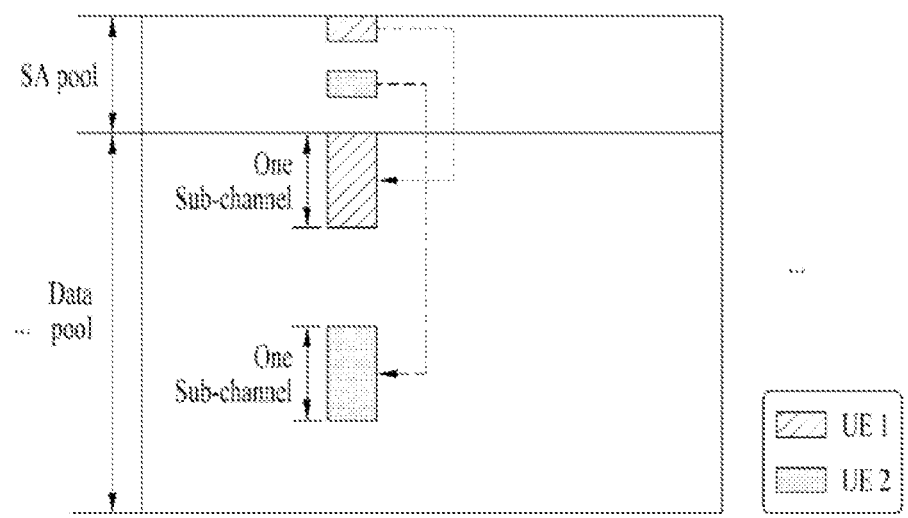
FIG. 15 illustrates an example that PSCCH is transmitted in a sidelink transmission mode 3 or 4 to which the present disclosure is applicable.
Figure 15:
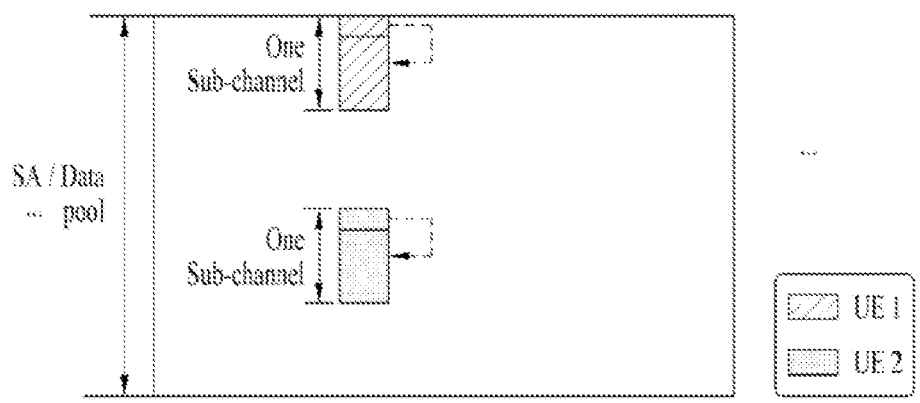

FIG. 15 illustrates an example of PSCCH transmission in sidelink transmission mode 3 or 4 to which the present disclosure is applicable.

In V2X communication, that is, in sidelink transmission mode 3 or 4, a PSCCH and a PSSCH are frequency division multiplexed (FDM) and transmitted, unlike sidelink communication. Since latency reduction is important in V2X in consideration of the nature of vehicle communication, the PSCCH and PSSCH are FDM and transmitted on the same time resources but different frequency resources. Referring to FIG. 15, the PSCCH and PSSCH may not be contiguous to each other as illustrated in FIG. 15 (a) or may be contiguous to each other as illustrated in FIG. 15 (b). A subchannel is used as a basic transmission unit. The subchannel may be a resource unit including one or more RBs in the frequency domain within a predetermined time resource (e.g., time resource unit). The number of RBs included in the subchannel (i.e., the size of the subchannel and the starting position of the subchannel in the frequency domain) may be indicated by higher layer signaling. The example of FIG. 15 may be applied to NR sidelink resource allocation mode 1 or 2.

Hereinafter, a cooperative awareness message (CAM) and a decentralized environmental notification message (DENM) will be described.

In V2V communication, a periodic message type of CAM and an event-triggered type of DENM may be transmitted. The CAM may include dynamic state information about a vehicle such as direction and speed, vehicle static data such as dimensions, and basic vehicle information such as ambient illumination states, path details, etc. The CAM may be 50 to 300 bytes long. In addition, the CAM is broadcast, and the latency thereof should be less than 100 ms. The DENM may be generated upon the occurrence of an unexpected incident such as a breakdown, an accident, etc. The DENM may be shorter than 3000 bytes, and it may be received by all vehicles within the transmission range thereof. The DENM may be prioritized over the CAM.

Hereinafter, carrier reselection will be described.

The carrier reselection for V2X/sidelink communication may be performed by MAC layers based on the channel busy ratio (CBR) of configured carriers and the ProSe per-packet priority (PPPP) of a V2X message to be transmitted.

The CBR may refer to a portion of sub-channels in a resource pool where S-RSSI measured by the UE is greater than a preconfigured threshold. There may be a PPPP related to each logical channel, and latency required by both the UE and BS needs to be reflected when the PPPP is configured. In the carrier reselection, the UE may select at least one carrier among candidate carriers in ascending order from the lowest CBR.

Hereinafter, physical layer processing will be described.

A transmitting side may perform the physical layer processing on a data unit to which the present disclosure is applicable before transmitting the data unit over an air interface, and a receiving side may perform the physical layer processing on a radio signal carrying the data unit to which the present disclosure is applicable.

Figure 16:
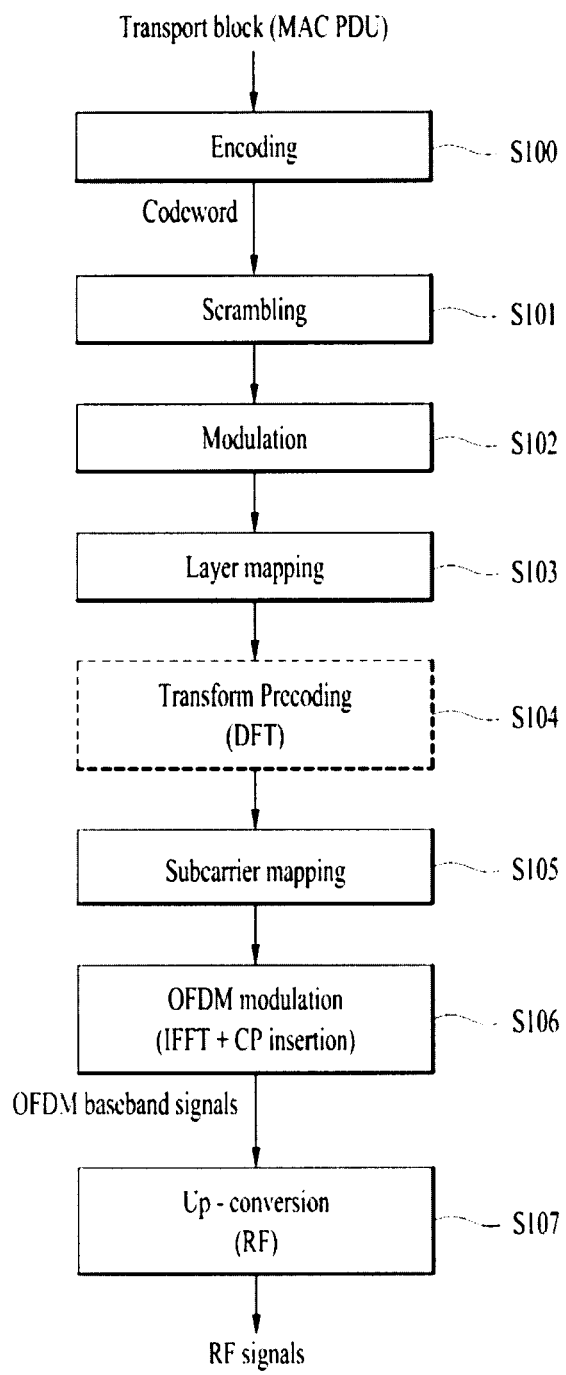
FIG. 16 illustrates an example of physical layer processing at a transmission side to which the present disclosure is applicable.

FIG. 16 illustrates physical layer processing at a transmitting side to which the present disclosure is applicable.

Table 3 shows a mapping relationship between UL transport channels and physical channels, and Table 4 shows a mapping relationship between UL control channel information and physical channels.

TABLE 3

| Transport channel | Physical channel |
|---|---|
| UL-SCH | PUSCH |
| RACH | PRACH |

TABLE 4

| Control information | Physical channel |
|---|---|
| UCI | PUCCH, PUSCH |

Table 5 shows a mapping relationship between DL transport channels and physical channels, and Table 6 shows a mapping relationship between DL control channel information and physical channels.

TABLE 5

| Transport channel | Transport channel |
|---|---|
| DL-SCH | PDSCH |
| BCH | PBCH |
| PCH | PDSCH |

TABLE 6

| Control information | Physical channel |
|---|---|
| DCI | PDCCH |

Table 7 shows a mapping relationship between sidelink transport channels and physical channels, and Table 8 shows a mapping relationship between sidelink control channel information and physical channels.

TABLE 7

| Transport channel | Transport channel |
|---|---|
| SL-SCH | PSSCH |
| SL-BCH | PSBCH |

TABLE 8

| Control information | Transport channel |
|---|---|
| SCI | PSCCH |

Figure 17:
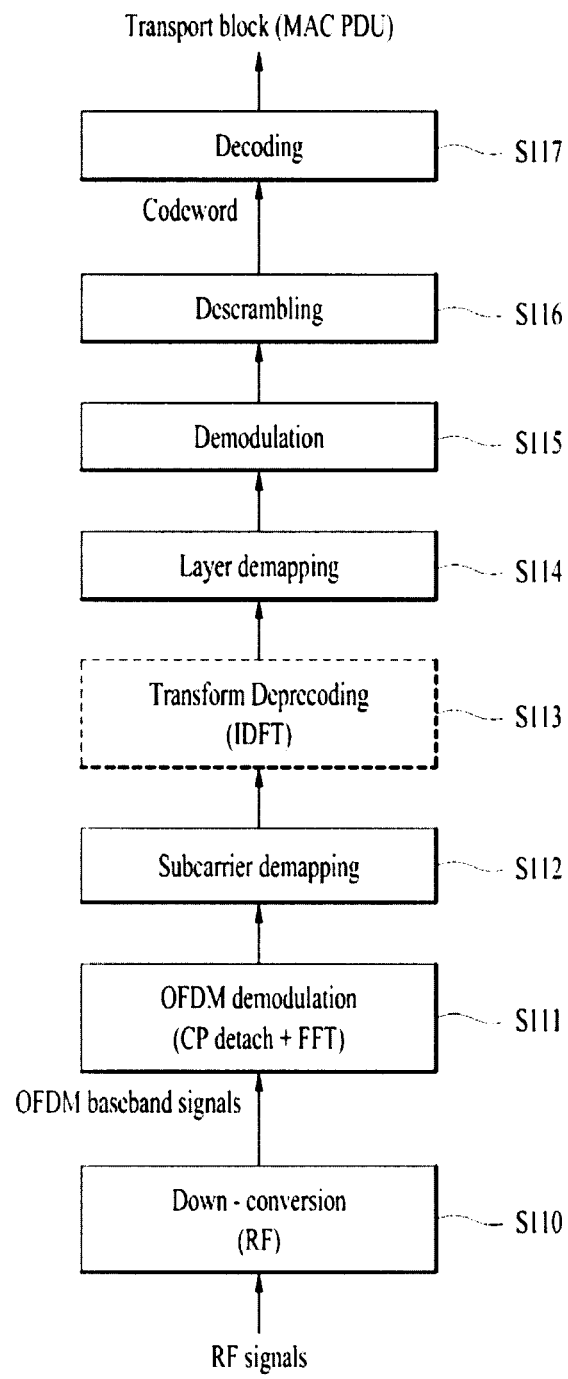
FIG. 17 illustrates an example of physical layer processing at a reception side to which the present disclosure is applicable.

Referring to FIG. 17, a transmitting side may encode a TB in step S100. The PHY layer may encode data and a control stream from the MAC layer to provide transport and control services via a radio transmission link in the PHY layer. For example, a TB from the MAC layer may be encoded to a codeword at the transmitting side. A channel coding scheme may be a combination of error detection, error correction, rate matching, interleaving, and control information or a transport channel demapped from a physical channel. Alternatively, a channel coding scheme may be a combination of error detection, error correcting, rate matching, interleaving, and control information or a transport channel mapped to a physical channel.

In the NR LTE system, the following channel coding schemes may be used for different types of transport channels and different types of control information. For example, channel coding schemes for respective transport channel types may be listed as in Table 9. For example, channel coding schemes for respective control information types may be listed as in Table 10.

TABLE 9

| Transport channel | Channel coding scheme |
|---|---|
| UL-SCH | LDPC(Low Density Parity Check) |
| DL-SCH | |
| SL-SCH | |
| PCH | |
| BCH | Polar code |
| SL-BCH | |

TABLE 10

| Control information | Channel coding scheme |
|---|---|
| DCI | Polar code |
| SCI | |
| UCI | Block code, Polar code |

For transmission of a TB (e.g., a MAC PDU), the transmitting side may attach a CRC sequence to the TB. Thus, the transmitting side may provide error detection for the receiving side. In sidelink communication, the transmitting side may be a transmitting UE, and the receiving side may be a receiving UE. In the NR system, a communication device may use an LDPC code to encode/decode a UL-SCH and a DL-SCH. The NR system may support two LDPC base graphs (i.e., two LDPC base metrics). The two LDPC base graphs may be LDPC base graph 1 optimized for a small TB and LDPC base graph 2 optimized for a large TB. The transmitting side may select LDPC base graph 1 or LDPC base graph 2 based on the size and coding rate R of a TB. The coding rate may be indicated by an MCS index, I_MCS. The MCS index may be dynamically provided to the UE by a PDCCH that schedules a PUSCH or PDSCH. Alternatively, the MCS index may be dynamically provided to the UE by a PDCCH that (re)initializes or activates UL configured grant type 2 or DL semi-persistent scheduling (SPS). The MCS index may be provided to the UE by RRC signaling related to UL configured grant type 1. When the TB attached with the CRC is larger than a maximum code block (CB) size for the selected LDPC base graph, the transmitting side may divide the TB attached with the CRC into a plurality of CBs. The transmitting side may further attach an additional CRC sequence to each CB. The maximum code block sizes for LDPC base graph 1 and LDPC base graph 2 may be 8448 bits and 3480 bits, respectively. When the TB attached with the CRC is not larger than the maximum CB size for the selected LDPC base graph, the transmitting side may encode the TB attached with the CRC to the selected LDPC base graph. The transmitting side may encode each CB of the TB to the selected LDPC basic graph. The LDPC CBs may be rate-matched individually. The CBs may be concatenated to generate a codeword for transmission on a PDSCH or a PUSCH. Up to two codewords (i.e., up to two TBs) may be transmitted simultaneously on the PDSCH. The PUSCH may be used for transmission of UL-SCH data and layer-1 and/or layer-2 control information. While not shown in FIG. 16, layer-1 and/or layer-2 control information may be multiplexed with a codeword for UL-SCH data.

In steps S101 and S102, the transmitting side may scramble and modulate the codeword. The bits of the codeword may be scrambled and modulated to produce a block of complex-valued modulation symbols.

In step S103, the transmitting side may perform layer mapping. The complex-valued modulation symbols of the codeword may be mapped to one or more MIMO layers. The codeword may be mapped to up to four layers. The PDSCH may carry two codewords, thus supporting up to 8-layer transmission. The PUSCH may support a single codeword, thus supporting up to 4-layer transmission.

In step S104, the transmitting side may perform precoding transform. A DL transmission waveform may be general OFDM using a CP. For DL, transform precoding (i.e., discrete Fourier transform (DFT)) may not be applied.

A UL transmission waveform may be conventional OFDM using a CP having a transform precoding function that performs DFT spreading which may be disabled or enabled. In the NR system, transform precoding, if enabled, may be selectively applied to UL. Transform precoding may be to spread UL data in a special way to reduce the PAPR of the waveform. Transform precoding may be a kind of DFT. That is, the NR system may support two options for the UL waveform. One of the two options may be CP-OFDM (same as DL waveform) and the other may be DFT-s-OFDM. Whether the UE should use CP-OFDM or DFT-s-OFDM may be determined by the BS through an RRC parameter.

In step S105, the transmitting side may perform subcarrier mapping. A layer may be mapped to an antenna port. In DL, transparent (non-codebook-based) mapping may be supported for layer-to-antenna port mapping, and how beamforming or MIMO precoding is performed may be transparent to the UE. In UL, both non-codebook-based mapping and codebook-based mapping may be supported for layer-to-antenna port mapping.

For each antenna port (i.e. layer) used for transmission of a physical channel (e.g. PDSCH, PUSCH, or PSSCH), the transmitting side may map complex-valued modulation symbols to subcarriers in an RB allocated to the physical channel.

In step S106, the transmitting side may perform OFDM modulation. A communication device of the transmitting side may add a CP and perform inverse fast Fourier transform (IFFT), thereby generating a time-continuous OFDM baseband signal on an antenna port p and a subcarrier spacing configuration u for an OFDM symbol 1 within a TTI for the physical channel. For example, for each OFDM symbol, the communication device of the transmitting side may perform IFFT on a complex-valued modulation symbol mapped to an RB of the corresponding OFDM symbol. The communication device of the transmitting side may add a CP to the IFFT signal to generate an OFDM baseband signal.

In step S107, the transmitting side may perform up-conversion. The communication device of the transmitting side may upconvert the OFDM baseband signal, the SCS configuration u, and the OFDM symbol 1 for the antenna port p to a carrier frequency f0 of a cell to which the physical channel is allocated.

Figure 24:
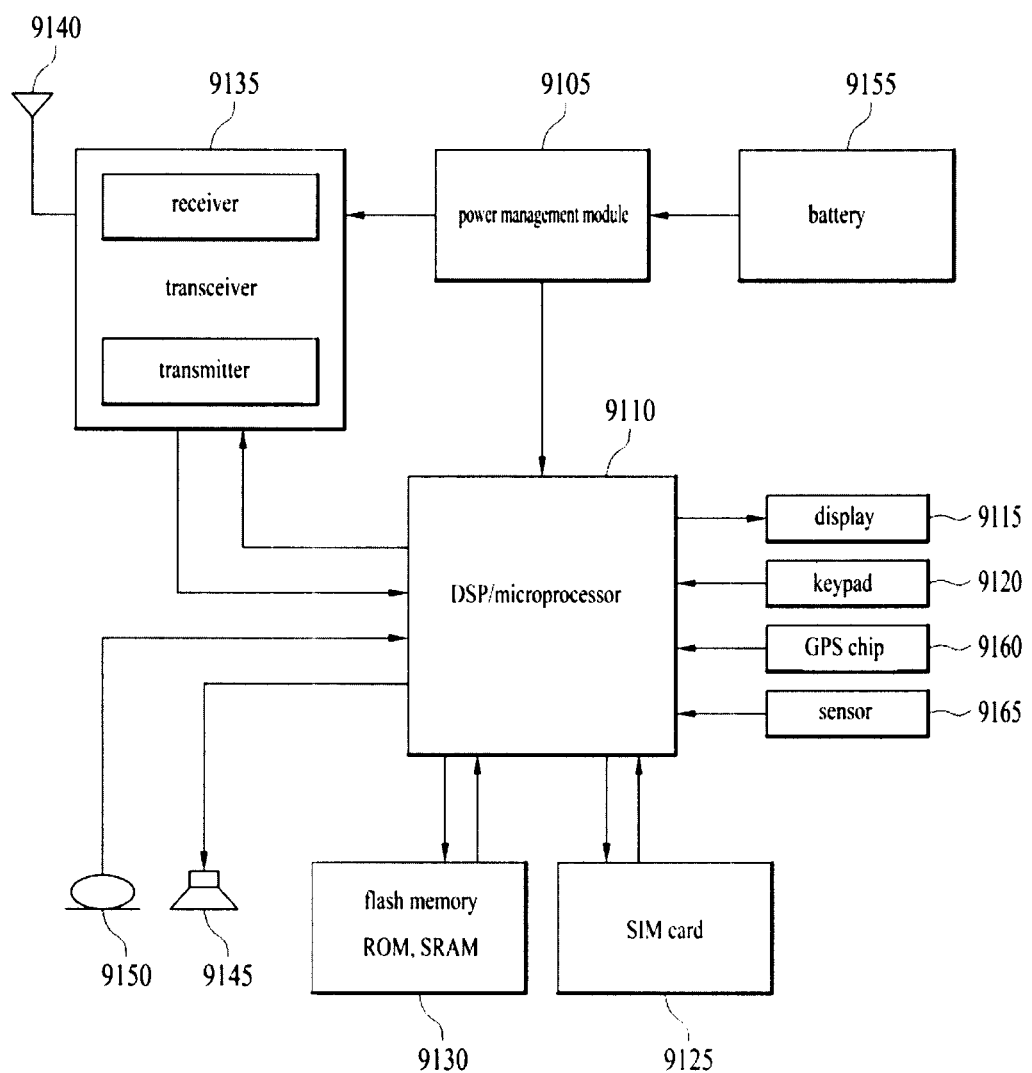

Processors 102 and 202 of FIG. 24 may be configured to perform encoding, scrambling, modulation, layer mapping, precoding transformation (for UL), subcarrier mapping, and OFDM modulation.

FIG. 17 illustrates PHY-layer processing at a receiving side to which the present disclosure is applicable.

The PHY-layer processing of the receiving side may be basically the reverse processing of the PHY-layer processing of a transmitting side.

In step S110, the receiving side may perform frequency downconversion. A communication device of the receiving side may receive a radio frequency (RF) signal in a carrier frequency through an antenna. A transceiver 106 or 206 that receives the RF signal in the carrier frequency may downconvert the carrier frequency of the RF signal to a baseband to obtain an OFDM baseband signal.

In step S111, the receiving side may perform OFDM demodulation. The communication device of the receiving side may acquire complex-valued modulation symbols by CP detachment and fast Fourier transform (FFT). For example, for each OFDM symbol, the communication device of the receiving side may remove a CP from the OFDM baseband signal. The communication device of the receiving side may then perform FFT on the CP-free OFDM baseband signal to obtain complex-valued modulation symbols for an antenna port p, an SCS u, and an OFDM symbol 1.

In step S112, the receiving side may perform subcarrier demapping. Subcarrier demapping may be performed on the complex-valued modulation symbols to obtain complex-valued modulation symbols of the physical channel. For example, the processor of a UE may obtain complex-valued modulation symbols mapped to subcarriers of a PDSCH among complex-valued modulation symbols received in a BWP.

In step S113, the receiving side may perform transform de-precoding. When transform precoding is enabled for a UL physical channel, transform de-precoding (e.g., inverse discrete Fourier transform (IDFT)) may be performed on complex-valued modulation symbols of the UL physical channel. Transform de-precoding may not be performed for a DL physical channel and a UL physical channel for which transform precoding is disabled.

In step S114, the receiving side may perform layer demapping. The complex-valued modulation symbols may be demapped into one or two codewords.

In steps S115 and S116, the receiving side may perform demodulation and descrambling. The complex-valued modulation symbols of the codewords may be demodulated and descrambled into bits of the codewords.

In step S117, the receiving side may perform decoding. The codewords may be decoded into TBs. For a UL-SCH and a DL-SCH, LDPC base graph 1 or LDPC base graph 2 may be selected based on the size and coding rate R of a TB. A codeword may include one or more CBs. Each coded block may be decoded into a CB to which a CRC has been attached or a TB to which a CRC has been attached, by the selected LDPC base graph. When CB segmentation has been performed for the TB attached with the CRC at the transmitting side, a CRC sequence may be removed from each of the CBs each attached with a CRC, thus obtaining CBs. The CBs may be concatenated to a TB attached with a CRC. A TB CRC sequence may be removed from the TB attached with the CRC, thereby obtaining the TB. The TB may be delivered to the MAC layer.

Figure 22:
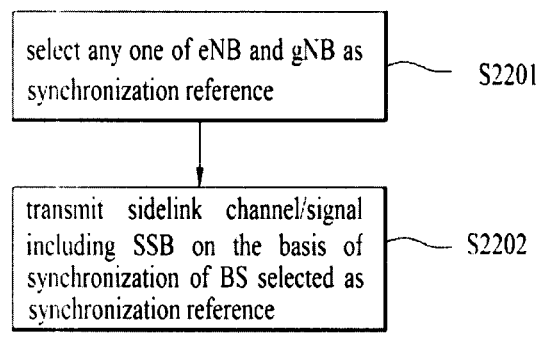
FIG. 22 is a flow chart related to one embodiment of the present disclosure.

Each of processors 102 and 202 of FIG. 22 may be configured to perform OFDM demodulation, subcarrier demapping, layer demapping, demodulation, descrambling, and decoding.

In the above-described PHY-layer processing on the transmitting/receiving side, time and frequency resources (e.g., OFDM symbol, subcarrier, and carrier frequency) related to subcarrier mapping, OFDM modulation, and frequency upconversion/downconversion may be determined based on a resource allocation (e.g., an UL grant or a DL assignment).

Synchronization acquisition of a sidelink UE will be described below.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 18:
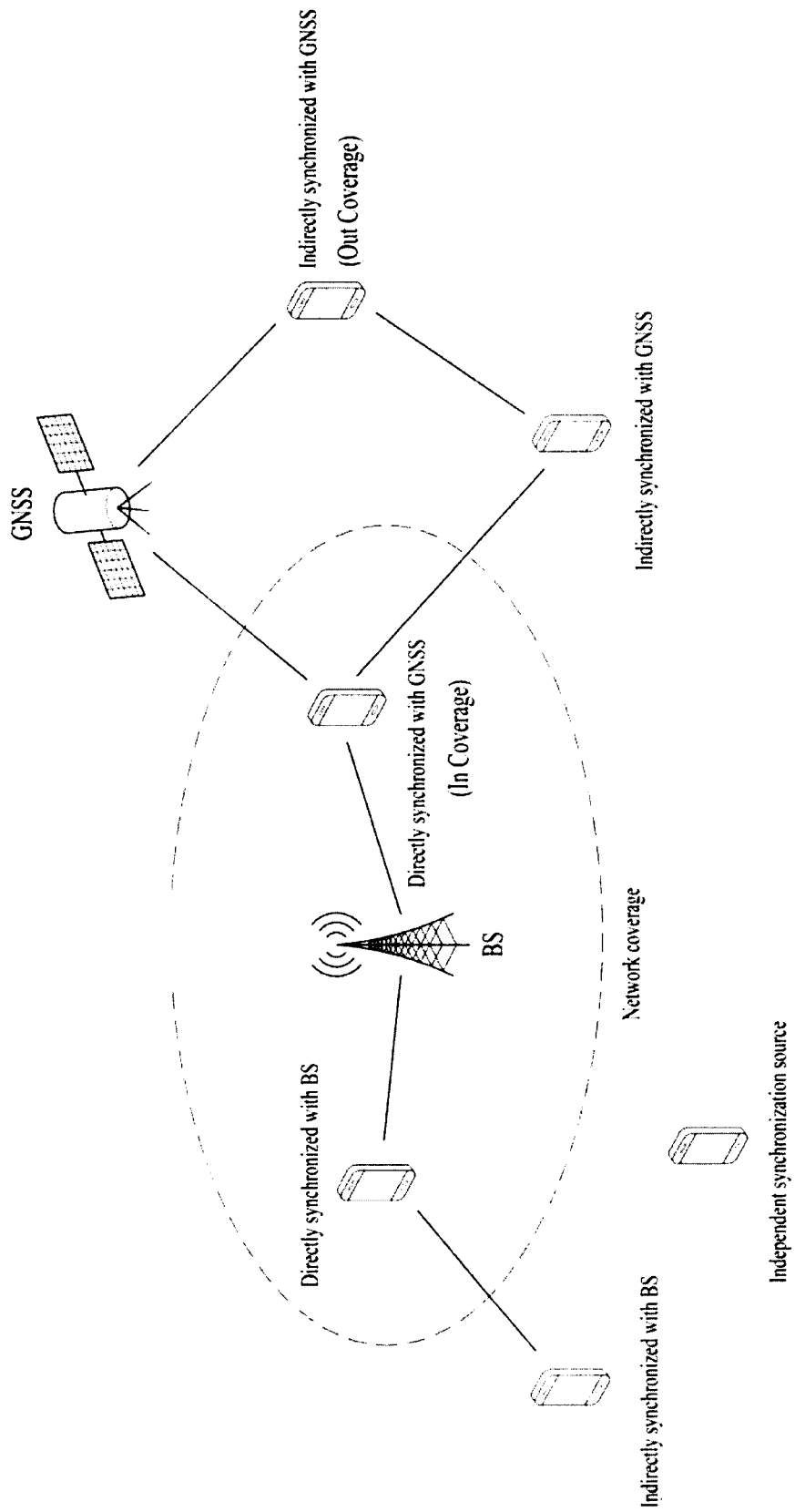
FIG. 18 illustrates a synchronization source or synchronization reference in V2X to which the present disclosure is applicable.

FIG. 18 illustrates a V2X synchronization source or reference to which the present disclosure is applicable.

Referring to FIG. 18, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or sidelink communication. In this case, the UE may follow the synchronization configuration received from the BS. When the UE fails in detecting any cell in the carrier used for the V2X or sidelink communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

A sidelink synchronization source may be related to a synchronization priority. For example, the relationship between synchronization sources and synchronization priorities may be defined as shown in Table 11. Table 11 is merely an example, and the relationship between synchronization sources and synchronization priorities may be defined in various manners.

TABLE 11

| Priority | GNSS-based synchronization | BS-based synchronization (eNB/gNB-based synchronization) |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

Whether to use GNSS-based synchronization or BS-based synchronization may be (pre)determined. In a single-carrier operation, the UE may derive its transmission timing from an available synchronization reference with the highest priority.

In the conventional sidelink communication, the GNSS, eNB, and UE may be set/selected as the synchronization reference as described above. In NR, the gNB has been introduced so that the NR gNB may become the synchronization reference as well. However, in this case, the synchronization source priority of the gNB needs to be determined. In addition, a NR UE may neither have an LTE synchronization signal detector nor access an LTE carrier (non-standalone NR UE). In this situation, the timing of the NR UE may be different from that of an LTE UE, which is not desirable from the perspective of effective resource allocation. For example, if the LTE UE and NR UE operate at different timings, one TTI may partially overlap, resulting in unstable interference therebetween, or some (overlapping) TTIs may not be used for transmission and reception. To this end, various implementations for configuring the synchronization reference when the NR gNB and LTE eNB coexist will be described based on the above discussion. Herein, the synchronization source/reference may be defined as a synchronization signal used by the UE to transmit and receive a sidelink signal or derive a timing for determining a subframe boundary. Alternatively, the synchronization source/reference may be defined as a subject that transmits the synchronization signal. If the UE receives a GNSS signal and determines the subframe boundary based on a UTC timing derived from the GNSS, the GNSS signal or GNSS may be the synchronization source/reference.

In the conventional sidelink communication, the GNSS, eNB, and UE may be set/selected as the synchronization reference as described above. In NR, the gNB has been introduced so that the NR gNB may become the synchronization reference as well. However, in this case, the synchronization source priority of the gNB needs to be determined. In addition, a NR UE may neither have an LTE synchronization signal detector nor access an LTE carrier (non-standalone NR UE). In this situation, the timing of the NR UE may be different from that of an LTE UE, which is not desirable from the perspective of effective resource allocation. For example, if the LTE UE and NR UE operate at different timings, one TTI may partially overlap, resulting in unstable interference therebetween, or some (overlapping) TTIs may not be used for transmission and reception. To this end, various implementations for configuring the synchronization reference when the NR gNB and LTE eNB coexist will be described based on the above discussion. Herein, the synchronization source/reference may be defined as a synchronization signal used by the UE to transmit and receive a sidelink signal or derive a timing for determining a subframe boundary. Alternatively, the synchronization source/reference may be defined as a subject that transmits the synchronization signal. If the UE receives a GNSS signal and determines the subframe boundary based on a UTC timing derived from the GNSS, the GNSS signal or GNSS may be the synchronization source/reference.

SSB(Synchronization Signal Block)

Figure 19:
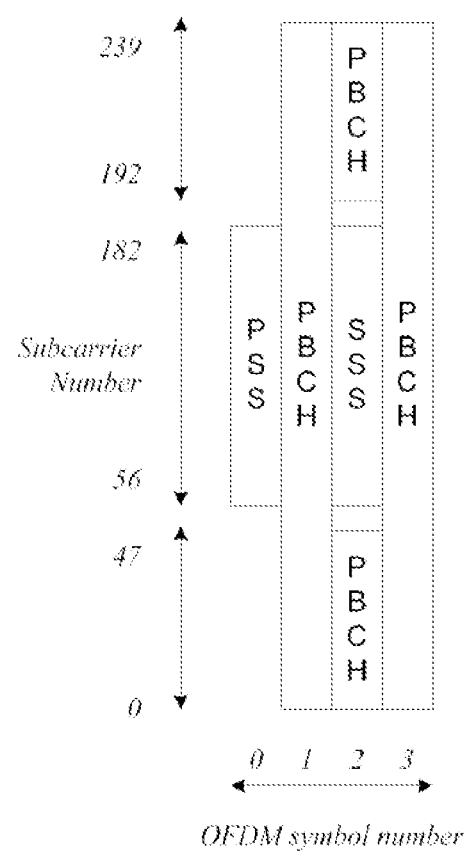
FIGS. 19 to 21 are views illustrating NR synchronization signal.

FIG. 19 illustrates an SSB structure. The UE may perform cell search, system information acquisition, beam alignment for initial access, DL measurement, etc. on the basis of SSB. The SSB and synchronization signal/physical broadcast channel (SS/PBCH) block are interchangeably used.

Referring to FIG. 19, the SSB includes a PSS, an SSS, and a PBCH. The SSB is configured over four consecutive OFDM symbols, and the PSS, PBCH, SSS/PBCH, and PBCH are transmitted per OFDM symbol. Each of the PSS and SSS may include 1 OFDM symbol and 127 subcarriers, and the PBCH may include 3 OFDM symbols and 576 subcarriers. Polar coding and quadrature phase shift keying (QPSK) are applied to the PBCH. The PBCH may include data REs and demodulation reference signal (DMRS) REs for each OFDM symbol. Three DMRS REs exist for each RB, and three data REs exist between the DMRS REs.

Cell Search

The cell search refers to a procedure in which the UE acquires time/frequency synchronization of a cell and detects a cell identifier (ID) (e.g., physical layer cell ID (PCID)) of the cell. The PSS may be used to detect a cell ID within a cell ID group, and the SSS may be used to detect a cell ID group. The PBCH may be used to detect an SSB (time) index and a half-frame.

The cell search procedure of the UE may be summarized as listed in Table 12 below.

TABLE 12

| | Type of Signals | Operations |
|---|---|---|
| 1st step | PSS | SS/PBCH block (SSB) symbol timing acquisition Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/Search space configuration |
| 5th Step | PDCCH and PDSCH | Cell access information RACH configuration |

336 cell ID groups exist, and each cell ID group may have three cell IDs. There may be 1008 cell IDs in total, the cell IDs may be defined by the Equation 1.

$$N_{ID}^{cell}=3N_{ID}^{(1)}+N_{ID}^{(2)}, \text{ where } N_{ID}^{(1)} \in \{0,1,\ldots,335\} \text{ and } N_{ID}^{(2)} \in \{0,1,2\} \quad \text{[Equation 1]}$$

In this case, $N_{ID}^{cell}$ denotes cell ID(e.g., PCID). $N_{ID}^{(1)}$ denotes a cell ID group, and is provided/acquired through the SSS. $N_{ID}^{(2)}$ denotes a cell ID within a cell ID group, and is provided/acquired through the PSS.

PSS sequence dPSS(n) may be defined to satisfy the Equation 2.

$$d_{PSS}(n)=1-2x(m)$$

$$m=(n+43N_{ID}^{(2)}) \bmod 127 \quad \text{[Equation 2]}$$

$$0 \le n < 127, \text{ where}$$

$$x(i+7)=(x(i+4)+x(i)) \bmod 2,$$

$$[x(6)\ x(5)\ x(4)\ x(3)\ x(2)\ x(1)\ x(0)]=[1\ 1\ 1\ 0\ 1\ 1\ 0].$$

SSS sequence dSSS(n) may be defined to satisfy the Equation 3.

$$d_{SSS}(n) = [1-2x_0((n+m_0) \bmod 127)][1-2x_1((n+m_1) \bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \le n < 127$$

$$x_0(i+7) = (x_0(i+4)+x_0(i)) \bmod 2$$

$$x_i(i+7) = (x_1(i+1)+x_1(i)) \bmod 2,$$

where $$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1].$$

Figure 20:
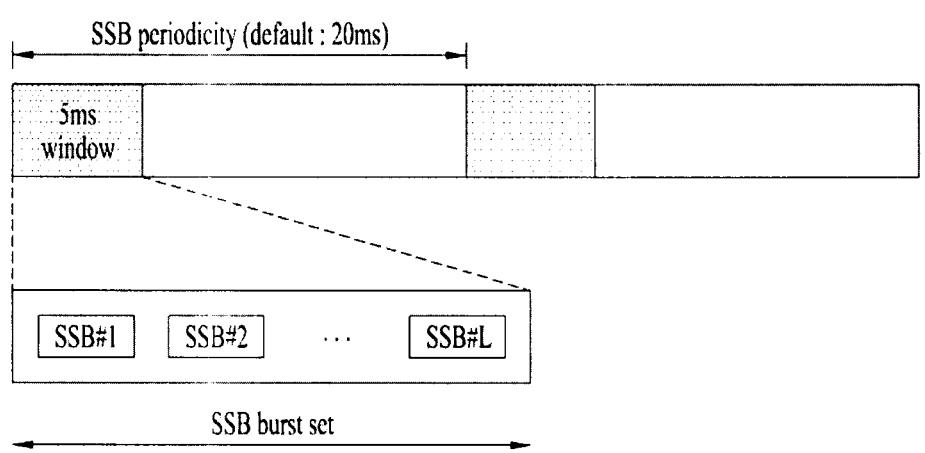

FIG. 20 illustrates SSB transmission.

Referring to FIG. 20, the SSB is periodically transmitted in accordance with the SSB periodicity. The basic SSB periodicity assumed by the UE in the initial cell search is defined as 20 ms. After cell access, the SSB periodicity may be set to one of {5 ms, 10 ms, 20 ms, 40 ms, 80 ms, 160 ms} by the network (e.g., the BS). An SSB burst set may be configured at the beginning of the SSB periodicity. The SSB burst set may be configured with a 5 ms time window (i.e., half-frame), and the SSB may be repeatedly transmitted up to L times within the SS burst set. The maximum number of transmissions of the SSB, L, may be given in accordance with the frequency band of the carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined in accordance with the SCS as follows. The time position of the SSB candidate is indexed from 0 to L-1 in temporal order within the SSB burst set (i.e., half-frame) (SSB index).

Case A—15 kHz SCS: The index of the start symbol of a candidate SSB is given as {2, 8}+14*n. When the carrier frequency is lower than or equal to 3 GHz, n=0, 1. When the carrier frequency is 3 GHz to 6 GHz, n=0, 1, 2, 3.

Case B—30 kHz SCS: The index of the start symbol of a candidate SSB is given as {4, 8, 16, 20}+28*n. When the carrier frequency is lower than or equal to 3 GHz, n=0. When the carrier frequency is 3 GHz to 6 GHz, n=0, 1.

Case C—30 kHz SCS: The index of the start symbol of a candidate SSB is given as {2, 8}+14*n. When the carrier frequency is lower than or equal to 3 GHz, n=0. When the carrier frequency is 3 GHz to 6 GHz, n=0, 1, 2, 3.

Case D—120 kHz SCS: The index of the start symbol of a candidate SSB is given as {4, 8, 16, 20}+28*n. When the carrier frequency is higher than 6 GHz, n=0, 1, 2, 3, 5, 6, 7, 8, 10, 11, 12, 13, 15, 16, 17, 18.

Case E—240 kHz SCS: The index of the start symbol of a candidate SSB is given as {8, 12, 16, 20, 32, 36, 40, 44}+56*n. When the carrier frequency is higher than 6 GHz, n=0, 1, 2, 3, 5, 6, 7, 8.

Figure 21:
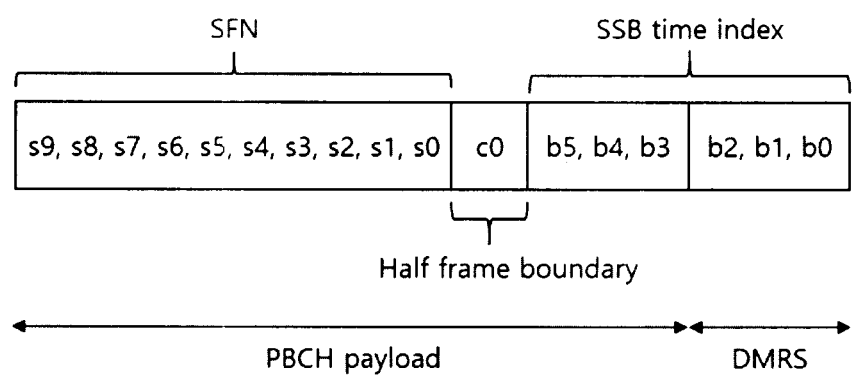

FIG. 21 illustrates that a UE acquires information on DL time synchronization.

The UE may acquire DL synchronization by detecting the SSB. The UE may identify the structure of the SSB burst set based on the detected SSB index and thus detect a symbol/slot/half-frame boundary. A number of the frame/half-frame to which the detected SSB belongs may be identified using SFN information and half-frame indication information.

In detail, the UE may acquire 10-bit System Frame Number (SFN) information from the PBCH (s0 to s9). 6 bits of the 10-bit SFN information are obtained from a Master Information Block (MIB), and the remaining 4 bits are obtained from a PBCH Transport Block (TB).

Next, the UE may acquire 1-bit half-frame indication information (c0). When a carrier frequency is 3 GHz or less, the half-frame indication information may implicitly be signaled using PBCH DMRS. The PBCH DMRS indicates 3-bit information by using one of eight PBCH DMRS sequences. Therefore, in case of L=4, 1 bit which remains after indicating the SSB index among 3 bits which may be indicated by using eight PBCH DRMS sequences may be used for half-frame indication.

Finally, the UE may acquire the SSB index based on a DMRS sequence and a PBCH payload. SSB candidates are indexed from 0 to L-1 within the SSB burst set (i.e., half-frame) in accordance with a temporal order. In case of L=8 or 64, Least Significant Bit (LSB) 3 bits of the SSB index may be indicated using eight different PBCH DMRS sequences (b0 to b2). In case of L=64, Most Significant Bit (MSB) 3 bits of the SSB index are indicated through the PBCH (b3 to b5). In case of L=2, LSB 2 bits of the SSB index may be indicated using four different PBCH DMRS sequences (b0 and b1). In case of L=4, 1 bit which remains after indicating the SSB index among 3 bits which may be indicated by using eight PBCH DRMS sequences may be used for the half-frame indication (b2).

Embodiment

A sidelink UE according to one embodiment of the present disclosure may select any one of eNB and gNB as a synchronization reference (S2201 of FIG. 22), and may transmit a sidelink signal/channel, which includes SSB(SS/PBCH block), on the basis of synchronization of a BS selected as the synchronization reference (S2202). At this time, if DC (Dual connectivity) is configured for the UE, the UE may select a master NB (NodeB) of the eNB and the gNB as a synchronization reference. In this case, the master NB means gNB in NE(NR & E-UTRA) DC, and means eNB in EN(E-UTRA & NR) DC. If DC (Dual connectivity) is not configured for the UE, the UE may select an NB having a high receiving power as a synchronization reference. Otherwise, if DC (Dual connectivity) is not configured for the UE, the UE may select an NB on a carrier paired with a carrier for which sidelink communication is performed, as a synchronization reference. Otherwise, if DC (Dual connectivity) is not configured for the UE, the UE may select an NB corresponding to a format for which sidelink communication is performed, as a synchronization reference.

In the aforementioned description, the eNB and the gNB may have the same priority as a synchronization reference. Also, in the aforementioned description, the following (some) rules may be restrictively applied to the case that (LTE)ENB and/or (NR) GNB is set to the highest SYNC Reference PRIORITY. That is, the eNB and the gNB may have the same priority as a synchronization reference, and in this case, it may be ambiguous whether the UE should select any one of the eNB and the gNB having the same priority as a synchronization reference. Therefore, this ambiguity may be solved through the aforementioned embodiment.

In short, in case of a UE (e.g., RRC CONNECTED UE) which performs NE DC or EN DC operation and/or in case of a UE (e.g., RRC CONNECTED UE, RRC IDLE UE) which has (SSB)-detected (LTE) ENB and/or (NR) GNB (at the same time), the UE may finally select its SYNC REFERENCE in accordance with at least one or more of the following rules 1) to 6). That is, in the aforementioned description, the rules of 2) to 6) are applied to the case that DC is not configured. However, unlike this case, at least one or more of the rules 1) to 6) may simultaneously be applied to NE DC or EN DC as conditions.

1) Based on SYNC of (DC) MASTER NB (or (DC) SECONDARY NB or PCELL NB), SL communication related (time/frequency) synchronization is (always) acquired (for example, in case of NE DC, MASTER NB and SECONDARY NB may be regarded as GNB and ENB, respectively, and in case of EN DC, MASTER NB and SECONDARY NB may be regarded as ENB and GNB, respectively), and/or 2) Based on SYNC of (DC) NB (or CELL), which has received SIB (or RRC information) that includes SL communication related resource pool information, SL communication related (time/frequency) synchronization is (always) acquired, and/or 3) Based on SYNC of (detection or connection) (DC) NB (or CELL) in which a relatively high receiving power (e.g., SSS of SSB (and/or PBCH DMRS) RSRP, CSI-RS RSRP, etc.) is measured, SL communication related (time/frequency) synchronization is acquired, and/or 4) Based on (detected or connected) (DC) NB (or CELL) related SYNC on carrier (e.g., carrier for acquiring SL SYNC) (previously) paired with carrier for which SL communication is performed, SL communication related (time/frequency) synchronization is acquired, and/or 5) Based on SYNC of (detected or connected) (LTE) ENB (or (NR) GNB), SL communication related (time/frequency) synchronization is (always) acquired, and/or 6) If SL communication is performed based on NR format, SL communication related (time/frequency) synchronization is (always) acquired based on SYNC of (NR) GNB (or based on SYNC of (LTE) ENB if SL communication is performed based on LTE format).

Also, the aforementioned (some) rules may enlargedly be applied for (DC) NB selection for which DL (RSRP) measurement is performed, as well as SYNC REFERENCE selection. In this case, for example, the term "PCELL (or NB)" on the aforementioned (some) rules may enlargedly be interpreted as "SERVING CELL or CAMPING CELL (e.g., RRC IDLE UE)" or "SCELL (e.g., RRC CONNECTED UE)". For example, the aforementioned (some) rules may restrictively be applied to MODE 1 (that is, mode for directly scheduling SL transmission resource of a UE by a BS) (and/or MODE 2 (that is, mode for independently selecting SL transmission resources within a preconfigured resource pool by a UE). For example, the aforementioned (some) rules may restrictively be applied to RRC CONNECTED UE (and/or RRC IDLE UE), or different (some) rules may be configured to be applied depending on RRC CONNECTION (or RRC IDLE). For example, the aforementioned (some) rules may be limited to the case that SL signal/channel transmission (and/or reception) related (time/frequency) synchronization reference is acquired. Also, for example, a rule applied to (time/frequency) synchronization reference selection for SL signal/channel transmission may be configured differently from a rule applied to SL signal/channel reception related (time/frequency) synchronization reference selection.

Meanwhile, the UE that has selected a synchronization reference may transmit a sidelink synchronization signal, that is, sidelink PSS and/or sidelink SSS through the SSB. At this time, the sidelink PSS and/or sidelink SSS is generated in accordance with at least one or more of the following descriptions. The following description related to generation of a sidelink synchronization signal may be applied to even a UE which does not select a synchronization reference as described above.

In the case that a plurality of sidelink PSSs or a plurality of sidelink SSSs are transmitted, each of the plurality of sidelink PSSs may be generated from different polynomial. In more detail, since transmission periodicity of the sidelink PSS/SSS may be longer than that of NR PSS/SSS transmission periodicity, the PSS and the SSS may repeatedly be transmitted within one slot. Therefore, in the case that a plurality of PSSs/SSSs are disposed in one S-SSB (sidelink SSB) due to the long transmission periodicity of the sidelink PSS/SSS, different generating polynomials are used to generate different PSSs when different PSSs are disposed. As another method for generating different PSSs, different cyclic shift values may be used. In this case, CS or generating polynomial of the PSS different from NR PSS is preferably used to get rid of ambiguity with the NR PSS. In this way, in the case that different PSS/SSS sequences are repeated, sidelobes are not accumulated during coherent detection, whereby detection performance may be improved.

As another example, in the case that a plurality of sidelink PSSs or a plurality of sidelink SSSs are transmitted through the SSB, the plurality of sidelink PSSs mean that the same PSSs are consecutively repeated, and the plurality of sidelink SSSs may mean that different sequences are used. That is, the same PSS may be repeated consecutively twice for symbol level detection, and the SSS may enhance detection performance by using different sequences.

As still another example, sidelink PSSs or sidelink SSSs transmitted through the SSB may be generated by comb type mapping of m sequence of length 63. In this case, whether comb type m sequence is mapped to even RE or odd RE may indicate at least one or more of (sync) beam index, sync resource index, purpose of use of sync signal, and sync source id information. Since the sidelink synchronization signal is transmitted from a time domain at a long period, it is preferable that the UE may detect PSS/SSS at a symbol level. Also, since Doppler may occur significantly, it is preferable that tone spacing is long. Therefore, m sequence of length 63 may be used for comb type mapping, and may be configured/established to indicate (sync) beam index or sync resource index, purpose of use of sync signal or sync source id information depending on comb index (mapping to even RE or odd RE) of PSS and/or SSS. At this time, a generating polynomial that may be used may selected from hexadecimal number values [25 29 2F 37 3B 3D].

As still another example, LTE sidelink PSSS/SSSS may be used by mapping to NR PSS/SSS position. At this time, the PSS/SSS may be transmitted from 12 RBs not 6 RBs by using comb mapping (0 is inserted between respective elements). In this case, LTE PSSS/SSSS generating method may be reused. Since some type of sequence remains, the existing detector may be used by partial deformation. At this time, PSS/SSS mapping scheme of NR SSB may be used to transmit different beams within one slot.

As further still another example, a generating polynomial which is not currently used in the PSS/SSS may be used. In more detail, [83 87 91 9D A7 AB B9 BF C1 CB D3 D4 E5 EF F1 F7 FD] indicate Irreducible and primitive polynomials of order 7 in hexadecimal numbers, and hexadecimal numbers currently used in the NR PSS and SSS are 83 and 91. Therefore, a polynomial of 83→[10000011]→$x^7$+$x^1$+1 and a polynomial of 91→[10010001]→$x^7$+$x^4$+1 are used. Therefore, for example, 87 may be used as the sidelink PSS, and 87 and 9D may be used as the sidelink SSSs. This may be expressed as binaries such as 10000111, 10011101, and may again be expressed as generating polynomials such as $X^7$+$X^2$+X+1, $x^7$±$x^4$±$x^3$±$x^2$+1.

The above irreducible and primitive polynomials are transformed into binaries as listed in the following Table, and polynomials which are not used in the PSS/SSS may be used for sidelink or V2X.

TABLE 13

| Hexadeciamal | binary |
| --- | --- |
| A7 | 1010 0111 |
| AB | 1010 1011 |
| B9 | 1011 1001 |
| BF | 1011 1111 |
| C1 | 1100 0001 |
| CB | 1100 1011 |
| D3 | 1101 0011 |
| D4 | 1101 0100 |
| E5 | 1110 0101 |
| EF | 1110 1111 |
| F1 | 1111 0001 |
| F7 | 1111 0111 |
| FD | 1111 1101 |

In accordance with the above configuration, complexity of the UE may be reduced. (A configuration having different generating polynomials of same sequence) also has a good correlation feature with the existing PSS/SSS.

Meanwhile, the embodiments of the present disclosure are not limited to direct communication between UEs, and may be used for an uplink or downlink, and in this case, the above proposed methods may be used by the BS or relay node.

Since the embodiments of the above-described proposed methods may be included in one of the implementation methods of the present disclosure, it will be apparent that the embodiments may be regarded as a kind of proposed methods. In addition, the above-described proposed methods may independently be implemented, but may also be implemented in the form of combination (or merge) thereof. A rule may be defined such that information as to whether to apply the proposed methods (or information on the rules of the proposed methods) may be notified from the BS to the UE or from the transmitting UE to the receiving UE through a predefined signal (e.g., physical layer signal or higher layer signal).

Overview of Device According to the Embodiment of the Present Disclosure

Hereinafter, a device to which the present disclosure is applicable will be described.

Figure 23:
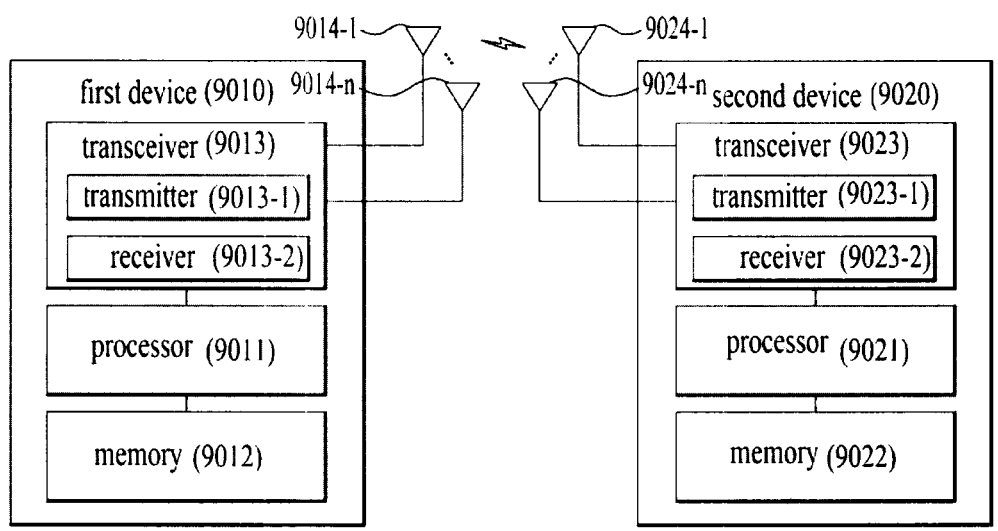
FIGS. 23 to 29 illustrate various devices to which the present disclosure is applicable.

FIG. 23 illustrates a wireless communication device according to one embodiment of the present disclosure.

Referring to FIG. 23, a wireless communication system may include a first device 9010 and a second device 9020.

The first device 9010 may be a device related to a base station, a network node, a transmitting user equipment (UE), a receiving UE, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

The second device 9020 may be a device related to a base station, a network node, a transmitting UE, a receiving UE, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

For example, the UE may include a portable phone, a smart phone, a laptop computer, a terminal for digital broadcasting, a personal digital assistants (PDA), a portable multimedia player (PMP), a navigator, a slate PC, a tablet PC, an ultrabook, a wearable device (e.g., a watch type terminal (smartwatch), a glasses type terminal (smart glasses), a head mounted display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing an object or background of a virtual world. For example, the AR device may include a device implementing an object or background of a virtual world by connecting it to an object or background of a real world. For example, the MR device may include a device implementing the object or background of the virtual world by merging it with the object or background of the real world. For example, the hologram device may include a device implementing a 360-degree stereographic image by recording and playing back stereographic information using the interference phenomenon of light generated when two lasers called holography meet each other. For example, the public safety device may include a video relay device or a video device capable of being worn on a user's body. For example, the MTC device and the IoT device may be devices that do not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or point of sales (POS). For example, the climate/environment device may include a device for monitoring or predicting the climate/environment.

The first device 9010 may include at least one processor such as a processor 9011, at least one memory device such as memory 9012, and at least one transceiver such as a transceiver 9013. The processor 9011 may perform the above-described functions, procedures, and/or methods. The processor 9011 may implement one or more protocols. For example, the processor 9011 may implement one or more layers of a radio interface protocol. The memory 9012 is connected to the processor 9011, and may store various types of information and/or instructions. The transceiver 9013 is connected to the processor 9011, and may be controlled to transmit and receive radio signals. The transceiver 9013 may be connected with one or more antennas 9014-1 to 9014-n, and the transceiver 9013 may be configured to transmit and receive user data, control information, a radio signal/channel, which are mentioned in the methods and/or operation flow chart in this specification, through one or more antennas 9014-1 to 9014-n. In this specification, the n antennas may be the number of physical antennas or the number of logical antenna ports.

The second device 9020 may include at least one processor such as a processor 9021, at least one memory device such as memory 9022, and at least one transceiver such as a transceiver 9023. The processor 9021 may perform the above-described functions, procedures and/or methods. The processor 9021 may implement one or more protocols. For example, the processor 9021 may implement one or more layers of a radio interface protocol. The memory 9022 is connected to the processor 9021, and may store various types of information and/or instructions. The transceiver 9023 is connected to the processor 9021 and may be controlled to transmit and receive radio signals. The transceiver 9023 may be connected with one or more antennas 9024-1 to 9024-$n$, and the transceiver 9023 may be configured to transmit and receive user data, control information, a radio signal/channel, which are mentioned in the methods and/or operation flow chart in this specification, through one or more antennas 9024-1 to 9024-$n$.

The memory 9012 and/or the memory 9022 may be connected inside or outside the processor 9011 and/or the processor 9021, respectively, and may be connected to another processor through various technologies, such as a wired or wireless connection. FIG. 24 illustrates a wireless communication device according to an implementation of the present disclosure.

FIG. 24 shows a more detailed view of the first or second device 9010 or 9020 of FIG. 22. However, the wireless communication device of FIG. 24 is not limited to the first or second device 9010 or 9020. The wireless communication device may be any suitable mobile computing device for implementing at least one configuration of the present disclosure such as a vehicle communication system or device, a wearable device, a portable computer, a smart phone, etc.

Referring to FIG. 24, the wireless communication device (UE) may include at least one processor (e.g., DSP, microprocessor, etc.) such as a processor 9110, a transceiver 9135, a power management module 9105, an antenna 9140, a battery 9155, a display 9115, a keypad 9120, a GPS chip 9160, a sensor 9165, a memory 9130, a subscriber identification module (SIM) card 9125 (which is optional), a speaker 9145, and a microphone 9150. The UE may include at least one antennas.

The processor 9110 may be configured to implement the above-described functions, procedures, and/or methods. In some implementations, the processor 9110 may implement one or more protocols such as radio interface protocol layers.

The memory 9130 is connected to the processor 9110 and may store information related to the operations of the processor 9110. The memory 9130 may be located inside or outside the processor 9110 and connected to other processors through various techniques such as wired or wireless connections.

A user may enter various types of information (e.g., instructional information such as a telephone number) by various techniques such as pushing buttons of the keypad 9120 or voice activation using the microphone 9150. The processor 9110 may receive and process the information from the user and perform appropriate functions such as dialing the telephone number. For example, the processor 9110 data may retrieve data (e.g., operational data) from the SIM card 9125 or the memory 9130 to perform the functions. As another example, the processor 9110 may receive and process GPS information from the GPS chip 9160 to perform functions related to the location of the UE, such as vehicle navigation, map services, etc. As a further example, the processor 9110 may display various types of information and data on the display 9115 for user reference and convenience.

The transceiver 9135 is connected to the processor 9110 and may transmit and receives a radio signal such as an RF signal. The processor 9110 may control the transceiver 9135 to initiate communication and transmit radio signals including various types of information or data such as voice communication data. The transceiver 9135 includes a receiver and a transmitter to receive and transmit radio signals. The antenna 9140 facilitates the radio signal transmission and reception. In some implementations, upon receiving radio signals, the transceiver 9135 may forward and convert the signals to baseband frequency for processing by the processor 9110. Various techniques may be applied to the processed signals. For example, the processed signals may be transformed into audible or readable information to be output via the speaker 9145.

In some implementations, the sensor 9165 may be coupled to the processor 9110. The sensor 9165 may include one or more sensing devices configured to detect various types of information including, but not limited to, speed, acceleration, light, vibration, proximity, location, image, and so on. The processor 9110 may receive and process sensor information obtained from the sensor 9165 and perform various types of functions such as collision avoidance, autonomous driving, etc.

In the example of FIG. 24, various components (e.g., camera, universal serial bus (USB) port, etc.) may be further included in the UE. For example, a camera may be coupled to the processor 9110 and used for various services such as autonomous driving, vehicle safety services, etc.

The UE of FIG. 24 is merely exemplary, and implementations are not limited thereto. That is, in some scenarios, some components (e.g., keypad 9120, GPS chip 9160, sensor 9165, speaker 9145, and/or microphone 9150) may not be implemented in the UE.

Figure 25:
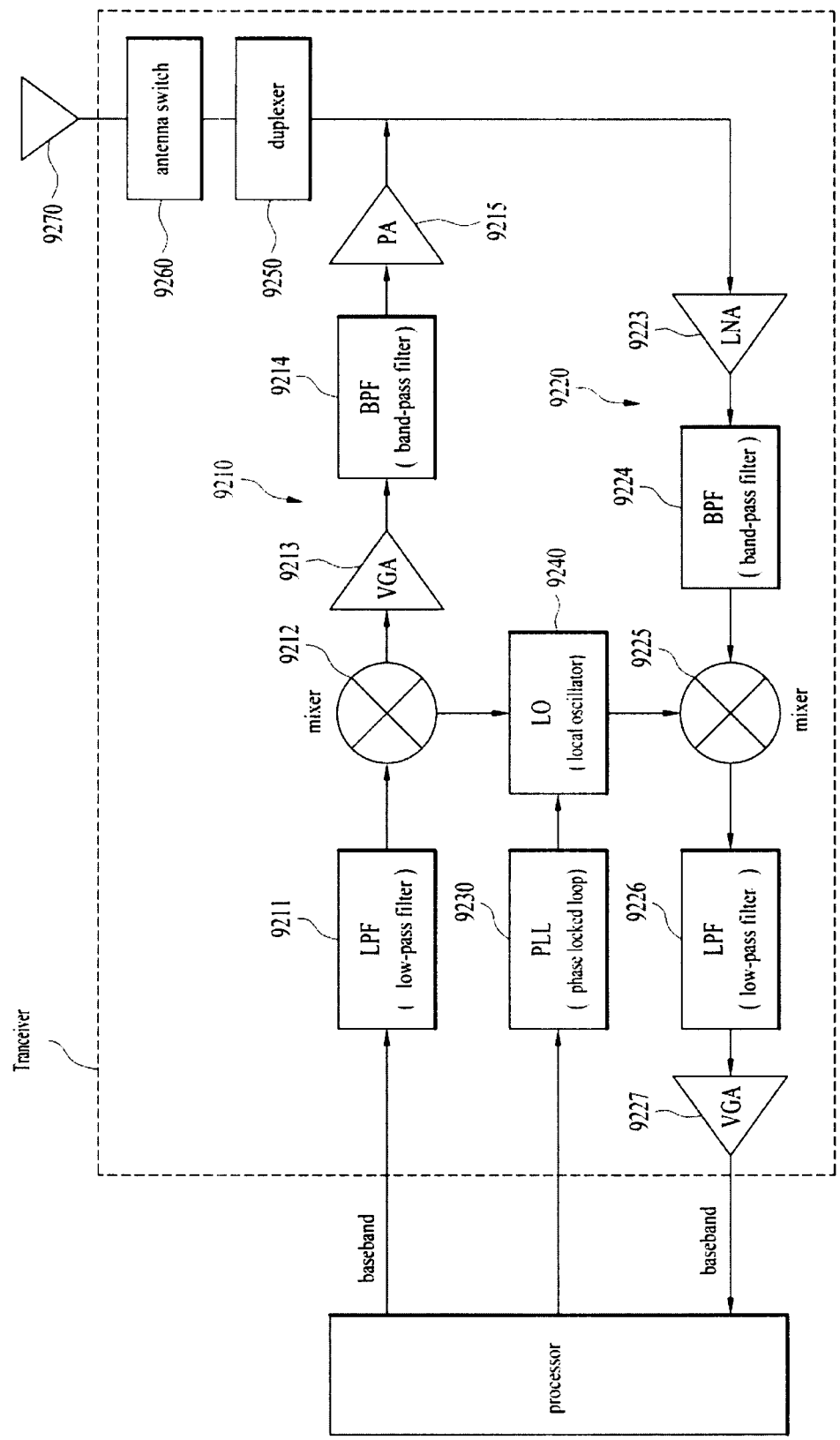

FIG. 25 illustrates a transceiver of a wireless communication device according to an implementation of the present disclosure. Specifically, FIG. 25 shows a transceiver that may be implemented in a frequency division duplex (FDD) system.

In the transmission path, at least one processor such as the processor described in FIGS. 23 and 24 may process data to be transmitted and then transmit a signal such as an analog output signal to a transmitter 9210.

In the transmitter 9210, the analog output signal may be filtered by a low-pass filter (LPF) 9211, for example, to remove noises caused by prior digital-to-analog conversion (ADC), upconverted from baseband to RF by an upconverter (e.g., mixer) 9212, and amplified by an amplifier 9213 such as a variable gain amplifier (VGA). The amplified signal may be filtered again by a filter 9214, further amplified by a power amplifier (PA) 9215, routed through duplexer 9250 and antenna switch 9260, and transmitted via an antenna 9270.

In the reception path, the antenna 9270 may receive a signal in a wireless environment. The received signal may be routed through the antenna switch 9260 and duplexer 9250 and sent to a receiver 9220.

In the receiver 9220, the received signal may be amplified by an amplifier such as a low noise amplifier (LNA) 9223, filtered by a band-pass filter 9224, and downconverted from RF to baseband by a downconverter (e.g., mixer) 9225.

The downconverted signal may be filtered by an LPF 9226 and amplified by an amplifier such as a VGA 9227 to obtain an analog input signal, which is provided to the at least one processor such as the processor.

Further, a local oscillator (LO) 9240 may generate and provide transmission and reception LO signals to the upconverter 9212 and downconverter 9225, respectively.

In some implementations, a phase locked loop (PLL) 9230 may receive control information from the processor and provide control signals to the LO 9240 to generate the transmission and reception LO signals at appropriate frequencies.

Implementations are not limited to the particular arrangement shown in FIG. 25, and various components and circuits may be arranged differently from the example shown in FIG. 25.

Figure 26:
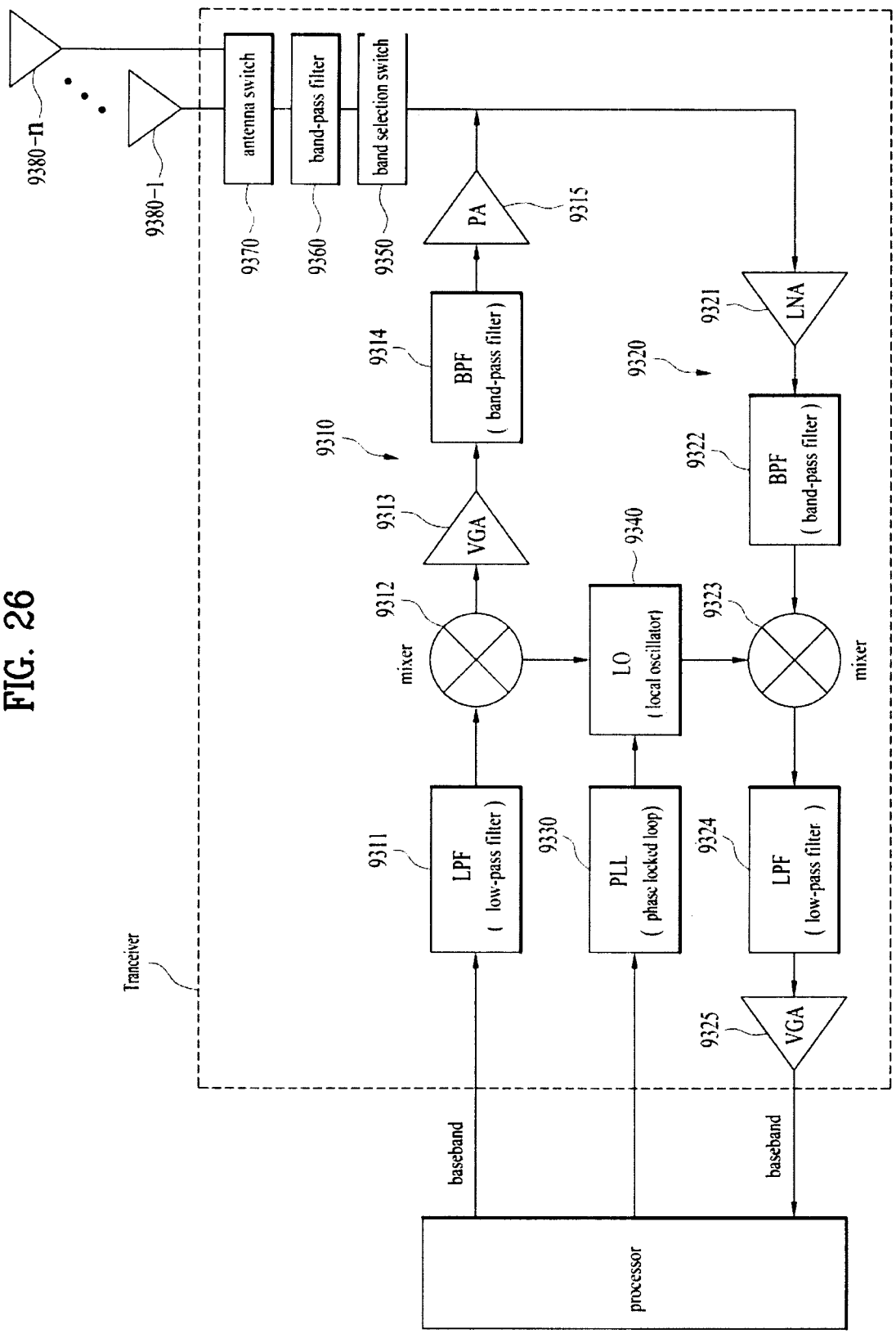

FIG. 26 illustrates a transceiver of a wireless communication device according to an implementation of the present disclosure. Specifically, FIG. 26 shows a transceiver that may be implemented in a time division duplex (TDD) system.

In some implementations, a transmitter 9310 and a receiver 9320 of the transceiver in the TDD system may have one or more similar features to those of the transmitter and the receiver of the transceiver in the FDD system. Hereinafter, the structure of the transceiver in the TDD system will be described.

In the transmission path, a signal amplified by a PA 9315 of the transmitter may be routed through a band selection switch 9350, a BPF 9360, and an antenna switch(s) 9370 and then transmitted via an antenna 9380.

In the reception path, the antenna 9380 may receive a signal in a wireless environment. The received signals may be routed through the antenna switch(s) 9370, the BPF 9360, and the band selection switch 9350 and then provided to the receiver 9320.

Figure 27:
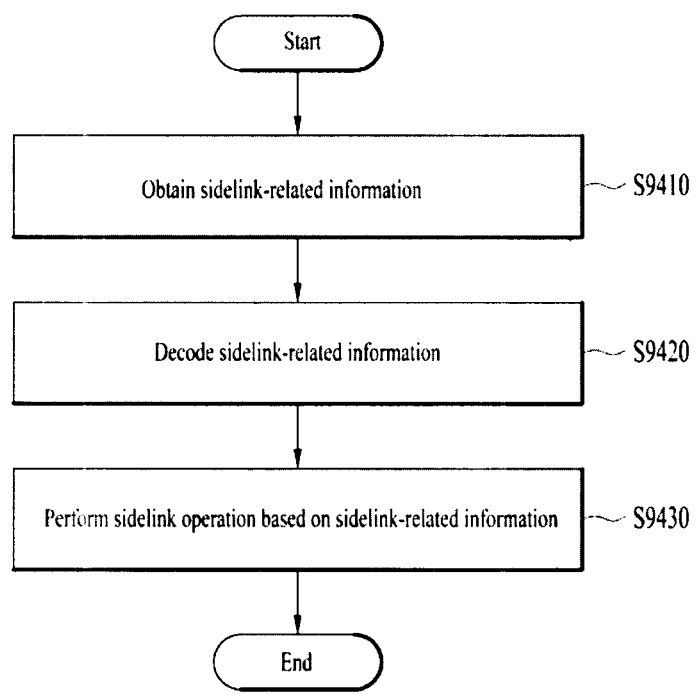

FIG. 27 illustrates sidelink operations of a wireless device according to an implementation of the present disclosure. The sidelink operations of the wireless device shown in FIG. 27 are merely exemplary, and the wireless device may perform sidelink operations based on various techniques. The sidelink may correspond to a UE-to-UE interface for sidelink communication and/or sidelink discovery. The sidelink may correspond to a PC5 interface as well. In a broad sense, the sidelink operation may mean information transmission and reception between UEs. Various types of information may be transferred through the sidelink.

Referring to FIG. 27, the wireless device may obtain sidelink-related information in step S9410. The sidelink-related information may include at least one resource configuration. The wireless device may obtain the sidelink-related information from another wireless device or a network node.

After obtaining the sidelink-related information, the wireless device may decode the sidelink-related information in step S9420.

After decoding the sidelink-related information, the wireless device may perform one or more sidelink operations based on the sidelink-related information in step S9430. The sidelink operation(s) performed by the wireless device may include at least one of the operations described herein.

Figure 28:
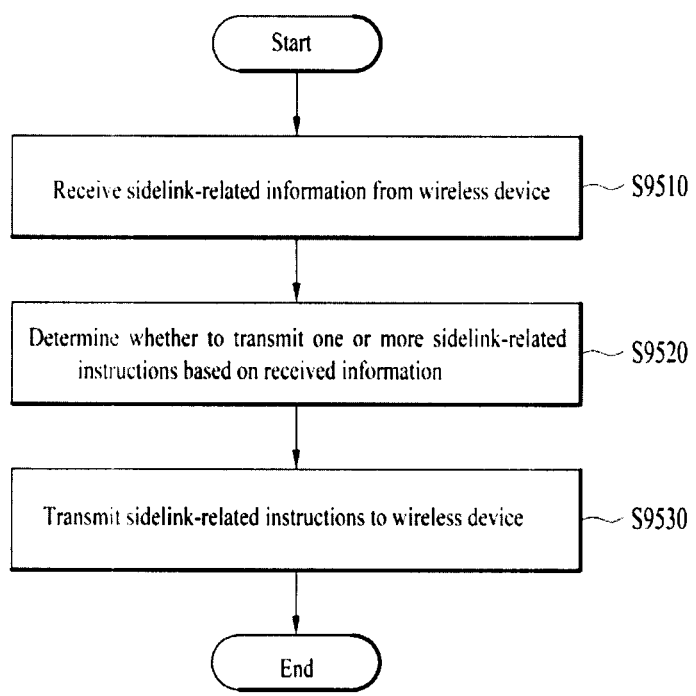

FIG. 28 illustrates sidelink operations of a network node according to an implementation of the present disclosure. The sidelink operations of the network node shown in FIG. 28 are merely exemplary, and the network node may perform sidelink operations based on various techniques.

Referring to FIG. 28, the network node may receive sidelink-related information from a wireless device in step S9510. For example, the sidelink-related information may correspond to Sidelink UE Information, which is used to provide sidelink information to a network node.

After receiving the sidelink-related information, the network node may determine whether to transmit one or more sidelink-related instructions based on the received information in step S9520.

When determining to transmit the sidelink-related instruction(s), the network node may transmit the sidelink-related instruction(s) to the wireless device in S9530. In some implementations, upon receiving the instruction(s) transmitted from the network node, the wireless device may perform one or more sidelink operations based on the received instruction(s).

Figure 29:
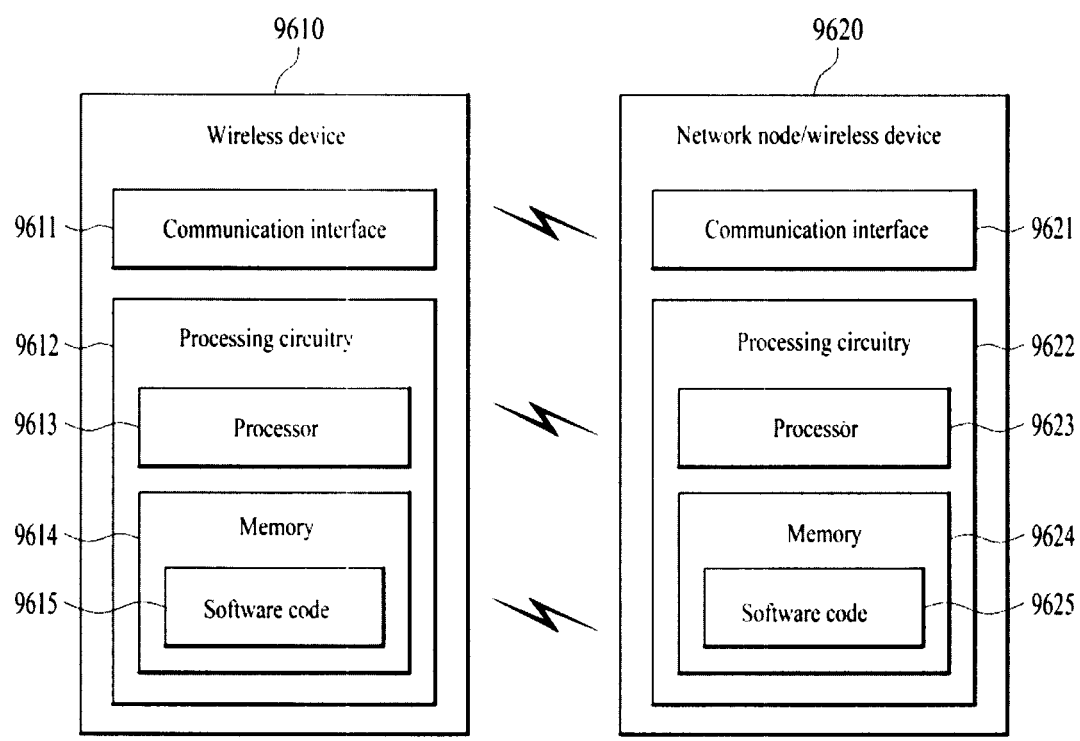

FIG. 29 illustrates the implementation of a wireless device and a network node according to an implementation of the present disclosure. The network node may be replaced with a wireless device or a UE.

Referring to FIG. 29, a wireless device 9610 may include a communication interface 9611 to communicate with one or more other wireless devices, network nodes, and/or other entities in the network. The communication interface 9611 may include one or more transmitters, one or more receivers, and/or one or more communications interfaces. The wireless device 9610 may include a processing circuitry 9612. The processing circuitry 9612 may include at least one processor such as a processor 9613 and at least one memory such as a memory 9614.

The processing circuitry 9612 may be configured to control at least one of the methods and/or processes described herein and/or enable the wireless device 9610 to perform the methods and/or processes. The processor 9613 may correspond to one or more processors for performing the wireless device functions described herein. The wireless device 9610 may include the memory 9614 configured to store the data, programmable software code, and/or information described herein.

In some implementations, the memory 9614 may store software code 9615 including instructions that allow the processor 9613 to perform some or all of the above-described processes when driven by the at least one processor such as the processor 9613.

For example, the at least one processor such as the processor 9613 configured to control at least one transceiver such as a transceiver 2223 may process at least one processor for information transmission and reception.

A network node 9620 may include a communication interface 9621 to communicate with one or more other network nodes, wireless devices, and/or other entities in the network. The communication interface 9621 may include one or more transmitters, one or more receivers, and/or one or more communications interfaces. The network node 9620 may include a processing circuitry 9622. The processing circuitry 9622 may include a processor 9623 and a memory 9624.

In some implementations, the memory 9624 may store software code 9625 including instructions that allow the processor 9623 to perform some or all of the above-described processes when driven by at least one processor such as the processor 9623.

For example, the at least one processor such as the processor 9623 configured to control at least one transceiver such as a transceiver 2213 may process at least one processor for information transmission and reception.

The above-described implementations may be embodied by combining the structural elements and features of the present disclosure in various ways. Each structural element and feature may be selectively considered unless specified otherwise. Some structural elements and features may be implemented without any combination with other structural elements and features. However, some structural elements and features may be combined to implement the present disclosure. The operation order described herein may be changed. Some structural elements or feature in an implementation may be included in another implementation or replaced with structural elements or features suitable for the other implementation.

The above-described implementations of the present disclosure may be embodied through various means, for example, hardware, firmware, software, or any combination thereof. In a hardware configuration, the methods according the present disclosure may be achieved by at least one of one or more ASICs, one or more DSPs, one or more DSPDs, one or more PLDs, one or more FPGAs, one or more processors, one or more controllers, one or more microcontrollers, one or more microprocessors, etc.

In a firmware or software configuration, the methods according to the present disclosure may be implemented in the form of a module, a procedure, a function, etc. Software code may be stored in a memory and executed by a processor. The memory may be located inside or outside the processor and exchange data with the processor via various known means.

Those skilled in the art will appreciate that the present disclosure may be carried out in other specific ways than those set forth herein without departing from the spirit and essential characteristics of the present disclosure. Although the present disclosure has been described based on the 3GPP LTE/LTE-A system or 5G system (NR system), the present disclosure is also applicable to various wireless communication systems.

INDUSTRIAL APPLICABILITY

The above-described implementations of the present disclosure are applicable to various mobile communication systems.

The invention claimed is:

1. A method for transmitting a signal by a sidelink UE in a wireless communications system, the method comprising the steps of:
   selecting, by the sidelink UE, one of an eNB (evolved NodeB) or a gNB (Next Generation Node B) as a synchronization reference;
   generating, by the sidelink UE, one or more sidelink PSSs (Sidelink Primary Synchronization Signals) and one or more sidelink SSSs (Sidelink Secondary Synchronization Signals) based on a synchronization of the synchronization reference; and
   transmitting, by the sidelink UE, a sidelink SSB (Sidelink Synchronization block) including the one or more sidelink PSSs and the one or more sidelink SSSs,
   wherein, based on the one or more sidelink PSSs being a plurality of sidelink PSSs and a transmission periodicity of the sidelink SSB being longer than a transmission periodicity of an SSB received from the base station, at least one of a cyclic shift or a generating polynomial of the plurality of sidelink PSSs is different from at least one of a cyclic shift or a generating polynomial of the SSB received from the base station, respectively.

2. The method of claim 1,
   wherein, based on dual connectivity (DC) being configured for the UE, the UE selects a master NB (NodeB) between the eNB and the gNB as the synchronization reference, and
   wherein the master NB is the gNB for a NE (NR (New Radio) and an E-UTRA (Evolved UMTS (Universal Mobile Telecommunications System) Terrestrial Radio)), and is the eNB for EN (E-UTRA and NR) DC.

3. The method of claim 1, wherein the UE selects NB having a high receiving power as a synchronization reference when dual connectivity (DC) is not configured for the UE.

4. The method of claim 1, wherein the UE selects NB, which has received SIB (System Information Block) including sidelink related resource pool information, as a synchronization reference when dual connectivity (DC) is not configured for the UE.

5. The method of claim 1, wherein the UE selects NB on a carrier paired with a carrier for which sidelink communication is performed, as a synchronization reference when dual connectivity (DC) is not configured for the UE.

6. The method of claim 1, wherein the UE selects NB corresponding to a format for which sidelink communication is performed, as a synchronization reference when dual connectivity (DC) is not configured for the UE.

7. The method of claim 1, wherein the eNB and the gNB have the same priority as a synchronization reference.

8. The method of claim 1, wherein the eNB and the gNB are configured by the highest synchronization reference priority.

9. A sidelink UE for transmitting or receiving a signal in a wireless communication system, the sidelink UE comprising:
   a memory; and
   a processor coupled to the memory,
   wherein the processor:
      selects one of an eNB or a gNB as a synchronization reference,
      generates one or more sidelink PSSs (Sidelink Primary Synchronization Signals) and one or more sidelink SSSs (Sidelink Secondary Synchronization Signals) based on a synchronization of the synchronization reference, and
      transmits a sidelink SSB (Sidelink Synchronization block) including the one or more sidelink PSSs and the one or more sidelink SSSs,
   wherein, based on the one or more sidelink PSSs being a plurality of sidelink PSSs and a transmission periodicity of the sidelink SSB being longer than a transmission periodicity of an SSB received from the base station, at least one of a cyclic shift or a generating polynomial of the plurality of sidelink PSSs is different from at least one of a cyclic shift or a generating polynomial of the SSB received from the base station, respectively.

10. The UE of claim 9, wherein the sidelink UE is capable of communicating with at least one of another UE, a UE related to an autonomous driving vehicle, the BS or a network.

* * * * *